(12) United States Patent
Meyer

(10) Patent No.: US 10,062,043 B2
(45) Date of Patent: *Aug. 28, 2018

(54) SYSTEM AND METHOD FOR DYNAMICALLY COORDINATING TASKS, SCHEDULE PLANNING, AND WORKLOAD MANAGEMENT

(71) Applicant: Life Coded, LLC, New York, NY (US)

(72) Inventor: John J. Meyer, New York, NY (US)

(73) Assignee: MOSAICAPP INC., New York, NY (US)

( * ) Notice: Subject to any disclaimer, the term of this patent is extended or adjusted under 35 U.S.C. 154(b) by 629 days.

This patent is subject to a terminal disclaimer.

(21) Appl. No.: 14/546,664

(22) Filed: Nov. 18, 2014

(65) Prior Publication Data

US 2015/0073849 A1    Mar. 12, 2015

Related U.S. Application Data

(62) Division of application No. 13/357,453, filed on Jan. 24, 2012, now Pat. No. 8,893,140.

(51) Int. Cl.
  *G06F 9/46*   (2006.01)
  *G06Q 10/06*  (2012.01)
  *G06F 9/48*   (2006.01)

(52) U.S. Cl.
  CPC ... *G06Q 10/063114* (2013.01); *G06F 9/4881* (2013.01)

(58) Field of Classification Search
  None
  See application file for complete search history.

(56) References Cited

U.S. PATENT DOCUMENTS

| 4,318,173 A | 3/1982 | Freedman et al. |
| 4,333,144 A | 6/1982 | Whiteside et al. |
| 5,381,546 A * | 1/1995 | Servi .............. G06F 9/4881 709/226 |

(Continued)

OTHER PUBLICATIONS

Collins et al. "Automated assignment and scheduling of service personnel", 1994 IEEE, pp. 33-39.*

(Continued)

*Primary Examiner* — Van Nguyen
(74) *Attorney, Agent, or Firm* — Leason Ellis LLP

(57) ABSTRACT

Systems and methods for dynamically coordinating a plurality of tasks are provided. Such tasks include a priority rank and at least one of a target date, a classification, an associated application, an associated action, and an associated priority rank adjustment parameter. A particular task can be processed relative to other tasks to generate a first scheduling scheme that defines a prioritized arrangement of the tasks. Based on the priority rank adjustment parameter(s), further scheduling schemes can be generated in lieu of the first scheduling scheme, thereby accounting for the respective priority rank adjustment parameters by influencing the arrangement of the tasks relative to one another. Additionally, based on a status notification, the tasks can be processed to generate a scheduling scheme that accounts for the status notification by influencing the arrangement of the first task and the stored tasks relative to one another.

20 Claims, 17 Drawing Sheets

(56) References Cited

U.S. PATENT DOCUMENTS

| | | | |
|---|---|---|---|
| 6,047,260 A * | 4/2000 | Levinson | G06Q 10/06311 705/7.15 |
| 6,529,934 B1 | 3/2003 | Kawamura et al. | |
| 7,406,689 B2 | 7/2008 | Berstis et al. | |
| 7,831,973 B2 | 11/2010 | Amano et al. | |
| 8,522,240 B1 | 8/2013 | Merwarth et al. | |
| 8,874,456 B2 * | 10/2014 | Lakritz | G06Q 10/06 705/7.12 |
| 8,893,140 B2 * | 11/2014 | Meyer | G06F 9/4881 718/103 |
| 8,959,515 B2 * | 2/2015 | Qin | G06F 9/4881 709/223 |
| 2005/0010664 A1 | 1/2005 | Hubbard | |
| 2005/0027580 A1 | 2/2005 | Crici et al. | |
| 2005/0137925 A1 * | 6/2005 | Lakritz | G06Q 10/06 705/7.22 |
| 2005/0179246 A1 | 8/2005 | Keller et al. | |
| 2008/0109808 A1 | 5/2008 | Wing et al. | |
| 2009/0089133 A1 | 4/2009 | Johnson et al. | |
| 2009/0199192 A1 | 8/2009 | Laithwaite et al. | |
| 2009/0204471 A1 | 8/2009 | Elenbaas et al. | |
| 2009/0288031 A1 | 11/2009 | Solaro et al. | |
| 2011/0219378 A1 | 9/2011 | Sinz | |
| 2011/0257881 A1 | 10/2011 | Chen et al. | |

OTHER PUBLICATIONS

Keskin et al. "Exact response-time analysis for fixed-priority pre-emption-threshold scheduling", 2010 IEEE, 4 pages.*

* cited by examiner

| Back | List View | |
|------|-----------|---|
| | Business Personal | |

Today

| Start 9:00 AM | End 5:00 PM | Float 0% | Hrs |
|---|---|---|---|
| ▼ a- Developer Meeting | | | 1.5 |
| ▲ a- Contact Developers | | | 2 |
| a- Emails | | | 1 |
| F- Lunch | | | 1 |
| a- Screenshots | | | 2.5 |
| Total Time | | | 8 |

420A-N

Tomorrow

| Start 9:00 AM | End 7:30 PM | Float 33% | |
|---|---|---|---|
| a- Emails | | | 1 |
| a- Company Mark | | | 1.5 |
| a- Graphics | | | 1 |
| a- Flow Chart | | | 1/2 |
| F- Lunch | | | 1 |
| a- Flow Chart | | | 1 |
| a- Research | | | 1.5 |
| Total Time | | | 8 |

FIG. 5C

SYSTEM AND METHOD FOR DYNAMICALLY COORDINATING TASKS, SCHEDULE PLANNING, AND WORKLOAD MANAGEMENT

CROSS REFERENCE TO RELATED APPLICATIONS

This application is a Divisional of U.S. patent application Ser. No. 13/357,453, filed Jan. 24, 2012, now U.S. Pat. No. 8,893,140, which is hereby incorporated by reference in its entirety herein.

TECHNICAL FIELD OF THE INVENTION

This patent application relates generally to the field of dynamic coordination of tasks, and, in particular, to dynamic coordination of tasks based on various priority ranks and status notifications.

BACKGROUND OF THE INVENTION

Time and project management applications, such as those that allow for the creation and management of a calendar are well known. Applications such as Microsoft Outlook enable a user to create calendar entries (such as appointments and meetings), and to further manage such entries (e.g., editing the calendar entries). Additionally, many such programs (including Outlook) incorporate 'To Do List'-type applications or features, whereby a list of items can be generated. Such a list serves as a reminder to a user to accomplish the listed items, upon which the user can designate a particular item as 'completed,' thus removing it from the list.

While such applications may suffice in certain constant and predictable scenarios, they generally do not properly account for the fact that not all tasks are of equal importance. Accordingly in such existing applications, all items are presented in a sequential or chronological manner, without regard for the fact that certain of the items are more important than others.

In addition, when unexpected circumstances arise (which can happen frequently to certain users) existing applications are often ill equipped. For example, at any given times certain items may be completed (and thus should be removed from a list and/or calendar) while other previously scheduled items remain incomplete, and thus must be rescheduled. It can be appreciated that in such traditional applications, any scheduling or rescheduling operations must be performed manually by the user. For example, if a scheduled item is not completed at the initially designated time/date, traditional scheduling applications require that the user manually adjust the scheduling parameters of the item in order to reschedule it to another time/date. Additionally, given that in traditional applications the burden of rescheduling uncompleted tasks rests solely on the user, such tasks can be easily overlooked and/or forgotten about once their initially scheduled time has passed.

Moreover, existing time and project management applications are generally configured to achieve only the limited scheduling functions for which they are configured. Accordingly, users traditionally refer to such scheduling applications to identify a particular item to perform, and then such users must proceed to take further steps to actually perform the scheduled item (e.g., manually place a phone call or compose an email message), resulting in considerable inefficiency over time. Also, such applications generally do not define or otherwise identify a particular time during which a particular task can and/or should be performed or completed.

Additionally, traditional 'To Do List' applications generally require that a user manually indicate when a particular item on the list has been completed. Accordingly, users must generally expend additional effort to return to such an application only to indicate that a particular item has been completed. Such extra steps, though necessary, result either in inefficiency (on the part of users who conscientiously mark their items upon completion), or lack of accuracy (on the part of users who are less conscientious and thus do not manually indicate the completion of each item as completed).

It can be further appreciated that traditional applications are configured to schedule items in relatively rigid ways. That is, a meeting expected to take two hours will generally be scheduled as such, after which the schedule is free and another task can be scheduled. However, in reality, the ability of a user to accurately estimate the amount of time that one or more items might take on a given day can vary widely from day to day. For instance, despite diligent planning and time estimation, during the initial stages of a project various changes and/or unexpected events can often arise, resulting in delays, time overruns, etc. Conversely, during the later stages of a project, fewer delays, overruns, etc. are expected. However, current static scheduling applications are unable to effectively account for this discrepancy.

As such, it can be appreciated that existing applications do not enable a user to effectively schedule/plan the totality of the various tasks and items that the user must attend to in a dynamic manner.

It is with respect to these and other considerations that the disclosure made herein is presented.

SUMMARY OF THE INVENTION

Technologies are presented herein in support of a system and method for dynamic coordination of tasks. According to a first aspect, a computer implemented method for dynamically coordinating a plurality of tasks stored in a database using a computing device is provided, the computing device having a processor, a memory, and a coordination application stored in the memory and executable by the processor. The method includes receiving a first task, processing the first task relative to the plurality of stored tasks to generate a first scheduling scheme that defines a prioritized arrangement of the first task and the stored tasks, receiving a status notification concerning at least one of the first task and the stored tasks, based on the received status notification, further processing the first task and the stored tasks to dynamically generate a second scheduling scheme to replace any prior scheduling scheme, the second scheduling scheme comprising a prioritized arrangement of the first task and the stored tasks that accounts for the status notification by influencing the arrangement of the first task and the stored tasks relative to one another, and rendering a visual depiction of the most recently defined scheduling scheme.

According to a further aspect, the first task includes a priority rank and at least one of a target date, a classification, an associated application and an associated action, the first task and a set of the stored tasks each having a priority rank adjustment parameter associated therewith, and the method further includes: based on the priority rank adjustment parameter, further processing the first task and the stored tasks to dynamically generate a third scheduling scheme in lieu of any prior scheduling scheme that defines a prioritized arrangement of the first task and the stored tasks that accounts for the respective priority rank adjustment parameters by influencing the arrangement of the first task and the stored tasks relative to one another.

According to another aspect, a method for dynamically coordinating one or more scheduling schemes using a computing device is provided, the computing device having a processor, a memory, and a coordination application stored in the memory and executable by the processor. The method includes: exposing a scheduling scheme of a first user to a second user, receiving a task assignment from the second user, the task assignment reflecting an adjustment to the scheduling scheme of the first user, and processing the scheduling scheme of the first user and the task assignment to generate a further scheduling scheme for a first user.

According to another aspect, a method for dynamically managing workload across one or more scheduling schemes using a computing device is provided, the computing device having a processor, a memory, and a coordination application stored in the memory and executable by the processor. The method includes processing a first scheduling scheme with a second scheduling scheme, each of the scheduling schemes corresponding to a respective user, based on the processing, identifying a workforce insufficiency across the scheduling schemes, and generating one or more workforce augmentation suggestions to resolve the insufficiency.

According to another aspect, a dynamic coordination system is provided, the system including a processor, a control circuit operatively connected to the processor, a memory operatively connected to the control circuit and accessible by the processor, and a coordination application stored in the memory and executable in the processor. The dynamic coordination system is in communication with a database having a plurality of tasks. The coordination application, when executed by the processor, configures the control circuit to receive a first task, the first task including a priority rank and at least one of a target date, a classification, an associated application and an associated action, the first task and a set of the stored tasks each having a priority rank adjustment parameter associated therewith, process the first task relative to the plurality of stored tasks to generate a first scheduling scheme the defines a prioritized arrangement of the first task and the stored tasks, based on the priority rank adjustment parameter, further process the first task and the stored tasks to dynamically generate a second scheduling scheme in lieu of the first scheduling scheme that defines a prioritized arrangement of the first task and the stored tasks that accounts for the respective priority rank adjustment parameters by influencing the arrangement of the first task and the stored tasks relative to one another, and render a visual depiction of the most recently defined scheduling scheme.

These and other aspects, features, and advantages can be appreciated from the accompanying description of certain embodiments of the invention and the accompanying drawing figures.

BRIEF DESCRIPTION OF THE DRAWINGS

FIG. 5C depicts an exemplary screenshot showing a presentation of tasks in a list view in accordance with at least one embodiment disclosed herein;

DETAILED DESCRIPTION OF CERTAIN EMBODIMENTS OF THE INVENTION

Figure 1:
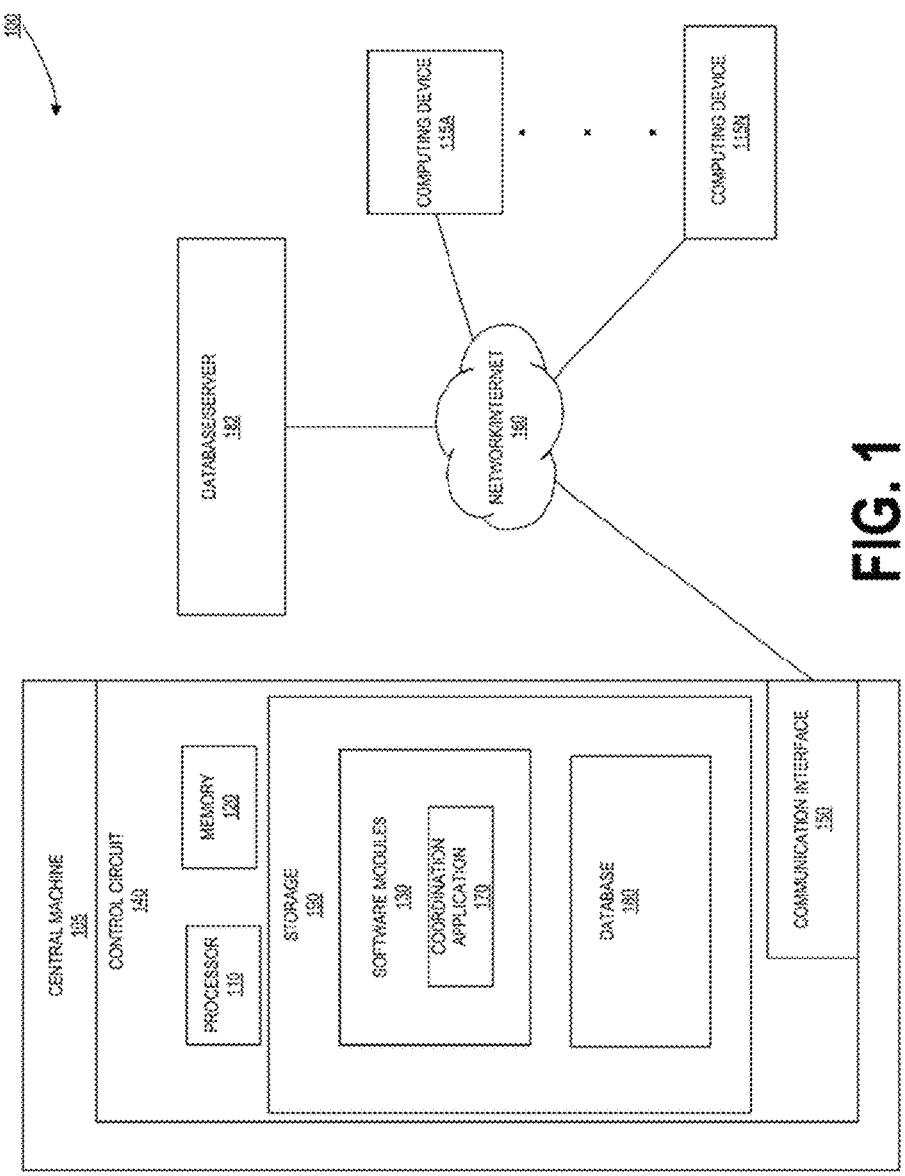
FIG. 1 is a high-level diagram illustrating an exemplary configuration of a of a dynamic coordination system in accordance with at least one embodiment disclosed herein.

By way of overview and introduction, the present disclosure details systems and methods for dynamically scheduling and coordinating various tasks. It can be appreciated that each of the various tasks managed by a task management/scheduling application can have any number of scheduling constraints and requirements associated with it. For instance, certain tasks (e.g., meetings) must be performed and/or completed at specified times, while other tasks are more flexible by nature, though even such tasks preferably be completed by a specified deadline. Moreover, it is common for users to be unable to complete all tasks as originally scheduled, and thus certain tasks must be re-scheduled in order to enable their completion. Additionally, not all tasks are of equal importance, and such importance is rarely static (for instance, it may increase or decrease over time, as long as the task remains incomplete).

The systems and methods described herein enable the dynamic scheduling and coordination of various tasks, accounting for a wide variety of factors, parameters, and considerations, including priority rank, user allocation of available time (e.g., business and personal schedules), fixed/flexible tasks, and various deadlines/completion dates that must be met. In doing so, various scheduling schemes are generated (and are subsequently re-generated in response to various events/inputs) that present the user with an up-to-date scheduling of the various tasks which require completion. In particular, in certain embodiments the systems and methods described herein can enable the dynamic scheduling and coordination of various tasks that are not necessarily associated with a particular date/time. As will be described herein, such tasks can be dynamically scheduled on the basis of various factors such as a priority rank of the task. Using the various systems and methods described herein enables a user to further plan and schedule future tasks and appointments, as well as presenting a user with an updated and optimized schedule that accounts for the various priorities and scheduling constraints that are associated with each individual task.

The following detailed description is directed to systems and methods for dynamic coordination of tasks. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a dynamic coordination system 100. In one arrangement, computing device 105 can be a personal computer or server. In other arrangements, computing device 105 can be a tablet computer, a laptop computer, or a mobile device/smartphone, though it should be understood that computing device 105 of dynamic coordination system 100 can be practically any computing device capable of embodying the systems and/or methods described herein.

Computing device 105 of dynamic coordination system 100 includes a control circuit 140 which is operatively connected to various hardware and software components that serve to enable operation of the dynamic coordination system 100. The control circuit 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++ or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within dynamic coordination system 100. For instance, program code stored in a computer readable storage device in a server can be downloaded over a network from the server to dynamic coordination system 100.

Preferably, included among the software modules 130 is a coordination application 170 that is executed by processor 110. During execution of the software modules 130, and specifically the coordination application 170, the processor 110 configures the control circuit 140 to dynamically coordinate one or more tasks with computing device 105, as will be described in greater detail below. It should be understood that while software modules 130 and/or coordination application 170 can be embodied in any number of computer executable formats, preferably software modules 130 and/or coordination application 170 comprise one or more applications that are configured to be executed at computing device 105 in conjunction with one or more applications or 'apps' executing at remote devices, such as remote device(s) 115A-N (collectively remote devices 115) and/or one or more viewers such as internet browsers and/or proprietary applications. Furthermore, in certain arrangements, software modules 130 and/or coordination application 170 can be configured to execute at the request or selection of a user of one of remote devices 115 (or any other such user having the ability to execute a program in relation to computing device 105, such as a network administrator), while in other arrangements computing device 105 can be configured to automatically execute software modules 130 and/or coordination application 170, without requiring an affirmative request to execute. It should also be noted that while FIG. 1 depicts memory 120 oriented on control circuit 140, in an alternate arrangement, memory 120 can be operatively connected to the control circuit 140. In addition, it should be noted that other information and/or data relevant to the operation of the present systems and methods (such as databases 180 and/or 182) can also be stored on storage 190, as will be discussed in greater detail below.

A communication interface 150 is also operatively connected to control circuit 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as the Internet. Such connections can include a wired connection or a wireless connection (e.g. using the 802.11 standard) though it should be understood that communication interface 150 can be practically any interface that enables communication to/from the control circuit 140.

At various points during the operation of dynamic coordination system 100, computing device 105 can communicate with one or more remote devices 115. The remote devices 115 transmit and/or receive data to/from the computing device 105, thereby preferably initiating maintaining, and/or enhancing the operation of the dynamic coordination system 100, as will be described in greater detail below. It should be understood that remote devices 115 can be in direct communication with computing device 105, indirect communication with computing device 105, and/or can be communicatively coordinated with computing device 105, as will be described in greater detail below. While remote device 115 can be practically any device capable of communication with computing device 105, in the preferred embodiment remote device 115 is a personal computer, server, handheld/portable computer, smartphone, personal digital assistant (PDA), tablet computer, and/or any other such computing device that is capable of transmitting and/or receiving data to/from computing device 105. It should also be appreciated that in many arrangements, computing device 115 will be substantially identical, from a structural and functional perspective, to computing device 105.

It should be noted that while the FIG. 1 depicts the dynamic coordination system 100 with respect to remote devices 115A-N, it should be understood that any number of remote devices can interact with the dynamic coordination system 100 in the manner described herein. It should be further understood that a substantial number of the operations described herein are initiated by and/or performed in relation to such remote devices 115. For example, as referenced above, such remote devices 115 can execute applications and/or viewers which request and/or receive data from computing device 105, substantially in the manner described in detail herein.

In certain arrangements, one or more external databases and/or servers 182 are also in communication with computing device 105. As will be described in greater detail below, database/server 182 is preferably a computing and/or storage device, and/or a plurality of computing and/or storage devices, that contain(s) information, such as calendars or tasks that can be relevant to the various operations and functions of computing device 105. Such external databases/servers 182 are in addition to the internal or local database 180 of computing device 105. It should be understood that databases 180 and 182 can, in many cases, contain similar, complimentary, and/or identical information. The primary distinction between database 180 and database 182 is that database 180 is local to computing device 105 (thus not requiring additional communication to access) while database 182 is external and thus requires communication between computing device 105 and database/server 182 in order to access the data stored therein. By way of illustration, database/server 182 can be an external server or site such as Microsoft Exchange server which contains one or more tasks or calendars that can be accessed in any number of ways, such as through an application programming interface (API), as is known to those of ordinary skill in the art, and thus incorporated into the various methods and systems described herein, as will be described in greater detail below. It should be noted that, as described in detail below, dynamic coordination system 100 can be configured such that various items can be stored at one location (such as at database 182), while various other related items can be stored at a second location (such as at database 180), as will be described in greater detail below.

At this juncture it should be noted that in certain arrangements, such as the one depicted in FIG. 1, remote devices 115 and/or database/server 182 can be in periodic or ongoing communication with computing device 105 thorough a computer network such as the Internet 160. Though not shown, it should be understood that in certain other arrangements, remote devices 115 and/or database/server 182 can be in periodic or ongoing direct communication with computing device 105, such as through communications interface 150.

In the description that follows, certain embodiments and/or arrangements are described with reference to acts and symbolic representations of operations that are performed by one or more devices, such as the dynamic coordination system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the dynamic coordination system 100. Other components shown in FIG. 1 can be varied from the illustrative examples shown. The different embodiments can be implemented using any hardware device or system capable of running program code. In another illustrative example, dynamic coordination system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to computing device 105, remote devices 115A-N, and database/server 182 are referred to herein as individual/single devices and/or machines, in certain arrangements the referenced devices and machines, and their associated and/or accompanying operations, features, and/or functionalities can be arranged or otherwise employed across any number of devices and/or machines, such as over a network connection, as is known to those of skill in the art.

The operation of the dynamic coordination system 100 and the various elements and components described above will be further appreciated with reference to various methods for dynamic coordination, association and/or depiction as described below, in conjunction with FIGS. 2-8.

Figure 2:
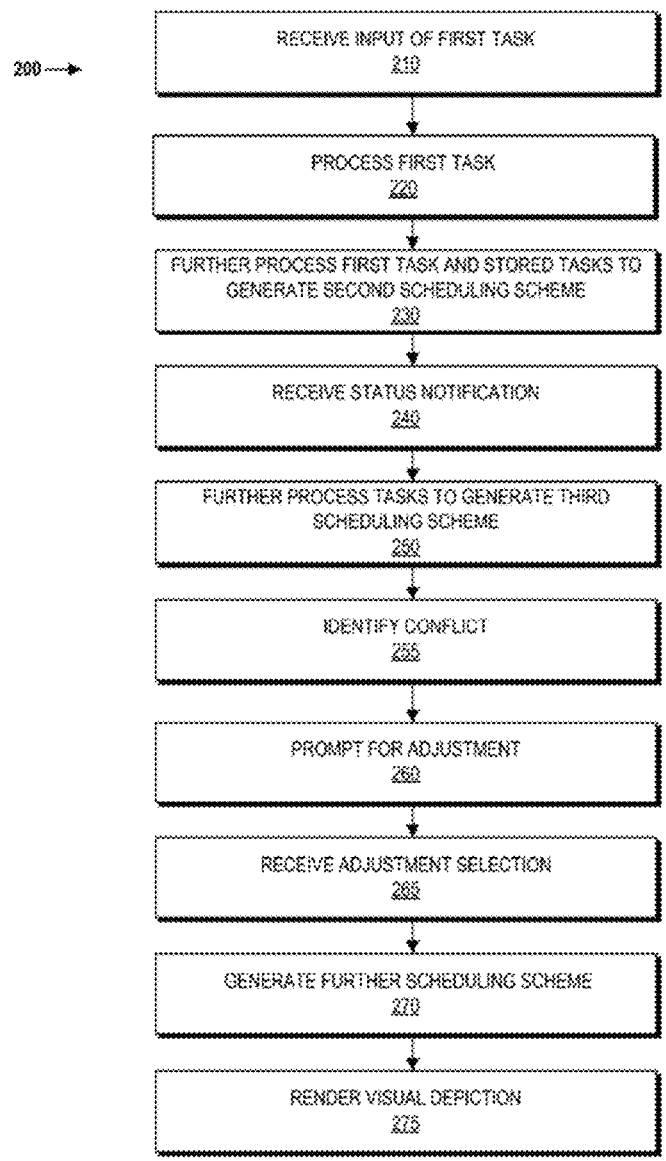
FIG. 2 is a flow diagram showing a routine that illustrates broad aspects of a method for dynamic coordination of tasks in accordance with at least one embodiment disclosed herein.

Turning now to FIG. 2, a flow diagram is described showing a routine 200 that illustrates a broad aspect of a method for dynamically coordinating a plurality of tasks at a computing device 105 in accordance with at least one embodiment disclosed herein. It should be appreciated that several of the logical operations described herein are implemented (1) as a sequence of computer implemented acts and/or program modules running on dynamic coordination system 100 and/or (2) as interconnected machine logic circuits or circuit modules within the dynamic coordination system 100 (FIG. 1). The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process 200 begins at step 210 where processor 110 executing one or more of software modules 130, including, preferably, coordination application 170, receiving one or more tasks, such as a first task. Examples of such tasks include files, records, and/or notifications corresponding to one or more phone calls, emails, meetings, or practically any other such event, action, and/or function. The tasks preferably include at least a priority rank that indicates a degree of importance, priority level, or rank with respect to the priority of a particular task. Thus, it can be appreciated that the priority rank ascribed to a particular task reflects the priority or importance of that particular task.

Also preferably included in and/or associated with a given task are one or more of the following items: a target date/time (reflecting the date/time upon which the task is expected to be completed by or on), a classification (reflecting a particular category or type associated with the task), an associated application (indicating and/or linking to a particular application, such as a phone application or an email application, with which the task is associated) and an associated action (corresponding to a particular or discrete action, such as 'forward invoice for report,' that is to be taken or performed). It should be understood that in certain arrangements, more or fewer of the referenced items are included within a given task. It should also be appreciated that the referenced items are merely exemplary, and any number of additional items can also be included within a given task.

It should be understood that each of the various tasks referenced herein preferably has its own associated priority rank adjustment parameter. The priority rank adjustment parameter is preferably a data item, field, setting, and/or parameter that defines one or more ways in which the priority rank of a particular task is to be adjusted. By way of illustration, a priority rank adjustment parameter can be a parameter that indicates that if a particular task is not completed by a certain date (or within a certain timeframe, such as a week or a month), the priority rank of that task should be incremented or adjusted, such as by increasing the priority rank of the particular task. In doing so, the priority rank of a particular task can change over time, thereby reflecting a change in the priority or importance of a particular task as time goes on, such as by increasing the priority rank of a particular task on a particular date, as will be described in greater detail below.

It should be noted that in certain arrangements the priority rank adjustment parameter can increase a priority rank (reflecting that a particular task is more important or urgent, given the passage of time), while in other arrangements the priority rank adjustment parameter can decrease the priority rank (reflecting that a task which has not been completed within a certain timeframe becomes less important as time goes on). It should be further understood that a given user can have a variety of tasks, some of which have priority rank adjustment parameters that increase over time, and others with priority rank adjustment parameters that decrease over time. Additionally, in certain arrangements a priority rank adjustment parameter can actually comprise multiple priority rank adjustment parameters. For example, a priority rank adjustment parameter for a particular task can incorporate a first priority rank adjustment parameter (e.g., increase the priority rank one week prior to the target completion date) and a second priority rank adjustment parameter (e.g., decrease the priority rank two weeks after the target completion date).

Figure 3A:
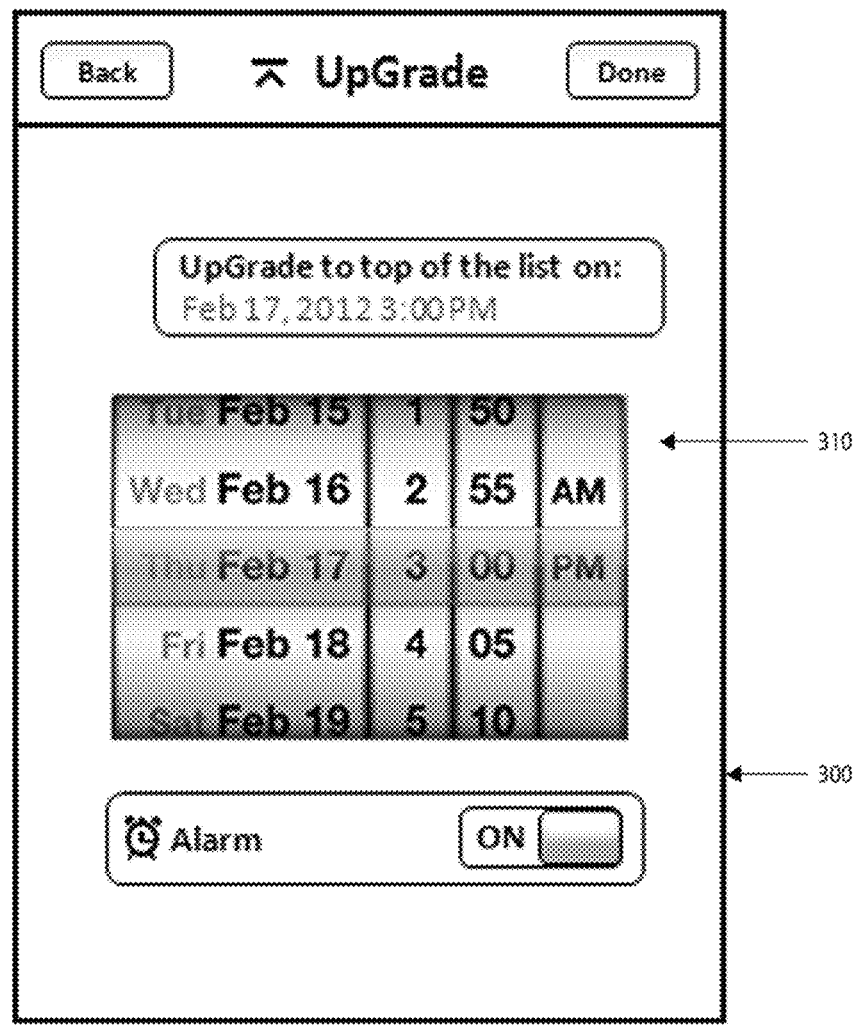
FIG. 3A depicts an exemplary screenshot showing an interface that enables a user to define a priority rank adjustment parameter in accordance with at least one embodiment disclosed herein.

Additionally, it should be understood that the referenced priority rank adjustment parameters can be defined either in an automated fashion, in a manual fashion, or in any combination thereof. For example, in certain arrangements system 100 can be configured such that a default priority rank adjustment parameter can be applied to all tasks, such as a priority rank adjustment parameter that increments the priority rank of a given task at a particular or relative time (e.g., one month after input, one week before the target completion date, after a specific date, etc.), while in other arrangements the priority rank adjustment parameter can be defined separately for each individual task. For example, FIG. 3A depicts an exemplary screenshot 300 generated by coordination application 170, showing an interface 310 that enables a user to define a priority rank adjustment parameter, wherein a specific date can be provided as the priority rank adjustment parameter for one or more tasks (as can be input through an interface described below in conjunction with FIG. 3B). In yet other arrangements, various rules and settings can be defined wherein certain tasks (e.g., tasks classified as business tasks) are ascribed one type of priority rank adjustment parameter (e.g., increase the priority rank of such a task one week before the target completion date), while other tasks (e.g., tasks classified as personal) are ascribed another type of priority rank adjustment parameter (e.g., decrease the priority rank of such a task one week after the target completion date.

It should be understood that various additional features and/or functionalities are also incorporated within the various systems and methods described herein. For example, a "snooze" feature and/or functionality enables the user to delay and/or postpone the adjustment of a priority rank (in the manner described above) until a later time/date.

Figure 3B:
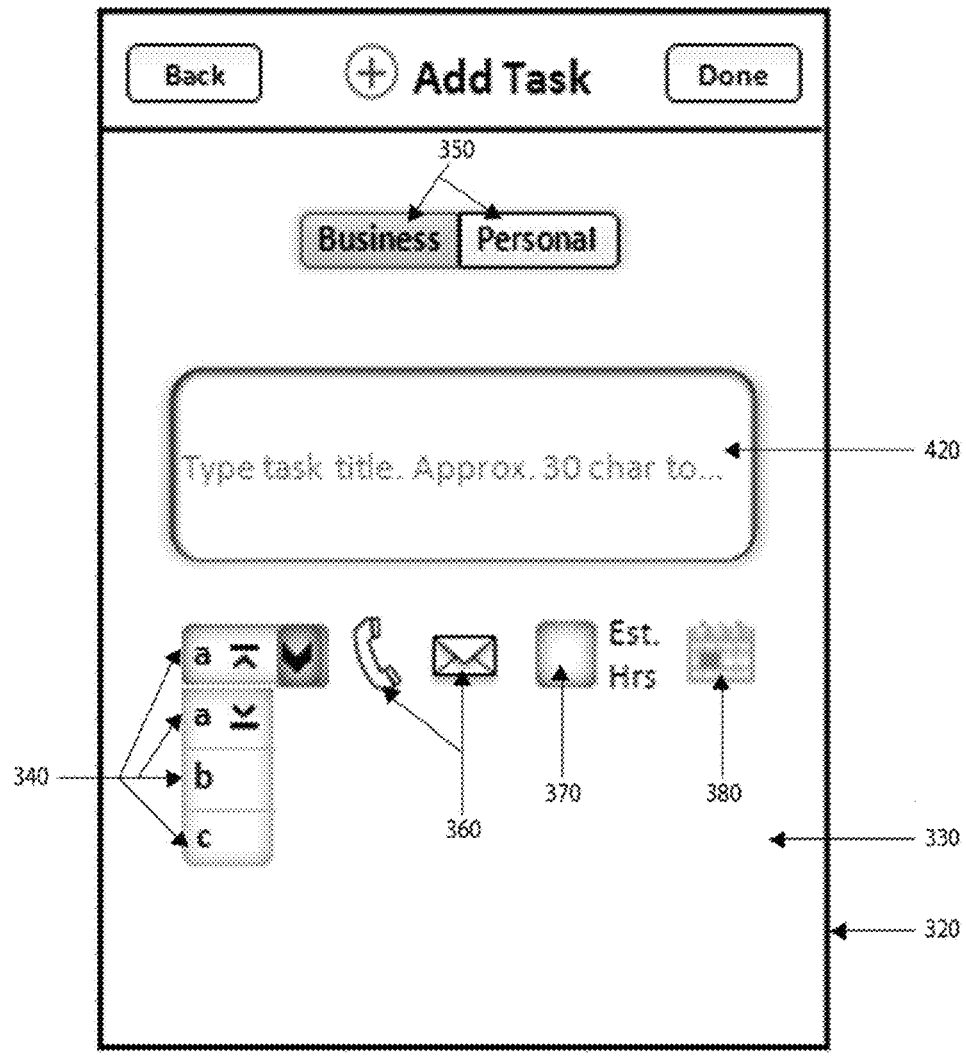
FIG. 3B depicts an exemplary screenshot showing an interface that enables a user to input and/or modify a task in accordance with at least one embodiment disclosed herein.

Various additional parameters can be associated with one or more task(s). For example, certain tasks can be defined such that they cannot be adjusted and/or reschedule in one or more of the ways described herein. Such tasks are commonly referred to as "fixed tasks," as their timing is fixed and cannot be rescheduled. Other tasks can be defined as being associated with a particular day of the week, and/or a particular time of day, month, etc. For example, certain appointments can only be scheduled on Mondays. Accordingly, if such an appointment needs to be rescheduled, it must be rescheduled for another Monday. FIG. 3B depicts an exemplary screenshot 320 generated by coordination application 170, showing an interface 330 that enables a user to input and/or modify a task 420. Through interface 330, the user can input various information corresponding to a particular task. For example, a name or title for the task 420 can be provided, preferably referencing or identifying the task itself. A priority rank adjustment 340 can be input or selected, such as from the list of priorities 'a-c' as shown in FIG. 3B, though it should be understood that practically any priority scheme (e.g., a numeric scheme designating the priority of a task) can be similarly implemented. A classification 350 (e.g., business or personal, though it should be understood that practically any other such classification, such as shopping or vacation, could be similarly used) and an associated action 360 (e.g., phone call/email) can also be selected. In addition, the user can input the estimated number of hours 370 that a particular task 420 is expected to take. In addition, a calendar link 380 enables the user to input various date/time related parameters relevant to the task 420, such as a fixed date (on which the task must be scheduled) and/or a target date (on which the task 420 is expected to be completed by). It should also be noted that one or more files or documents (not shown) can also be associated with and/or linked to a particular task 420. Such files or documents are preferably associated with a given task, such as a spreadsheet file that can be associated with a meeting where the content of the spreadsheet is to be discussed or presented.

Returning to FIG. 2, at step 220, processor 110 executing one or more of software modules 130, including, preferably, coordination application 170, processes at least one of the tasks relative to one or more of the other tasks in database 180, 182. In doing so, a scheduling scheme is generated that defines a prioritized arrangement of the various tasks. By way of example, upon receipt of a new task (such as in response to the input of a new task by a user), it must be determined how to account for this new task among the tasks already present in database 180, 182. Accordingly, the new task can be processed together with previously received tasks in order to generate a scheduling scheme that is consistent with and reflects the priority ranks of the various tasks. Thus, for example, upon receiving a new task having a 'high' priority rank, upon processing such a task with other stored tasks, the task with the 'high' priority is elevated above previously received tasks which have a priority rank of 'medium,' despite having been received later in time. In doing so, a user can be prompted to perform tasks which are of the highest current priority, not simply those that are the oldest or most recent.

Figure 4:
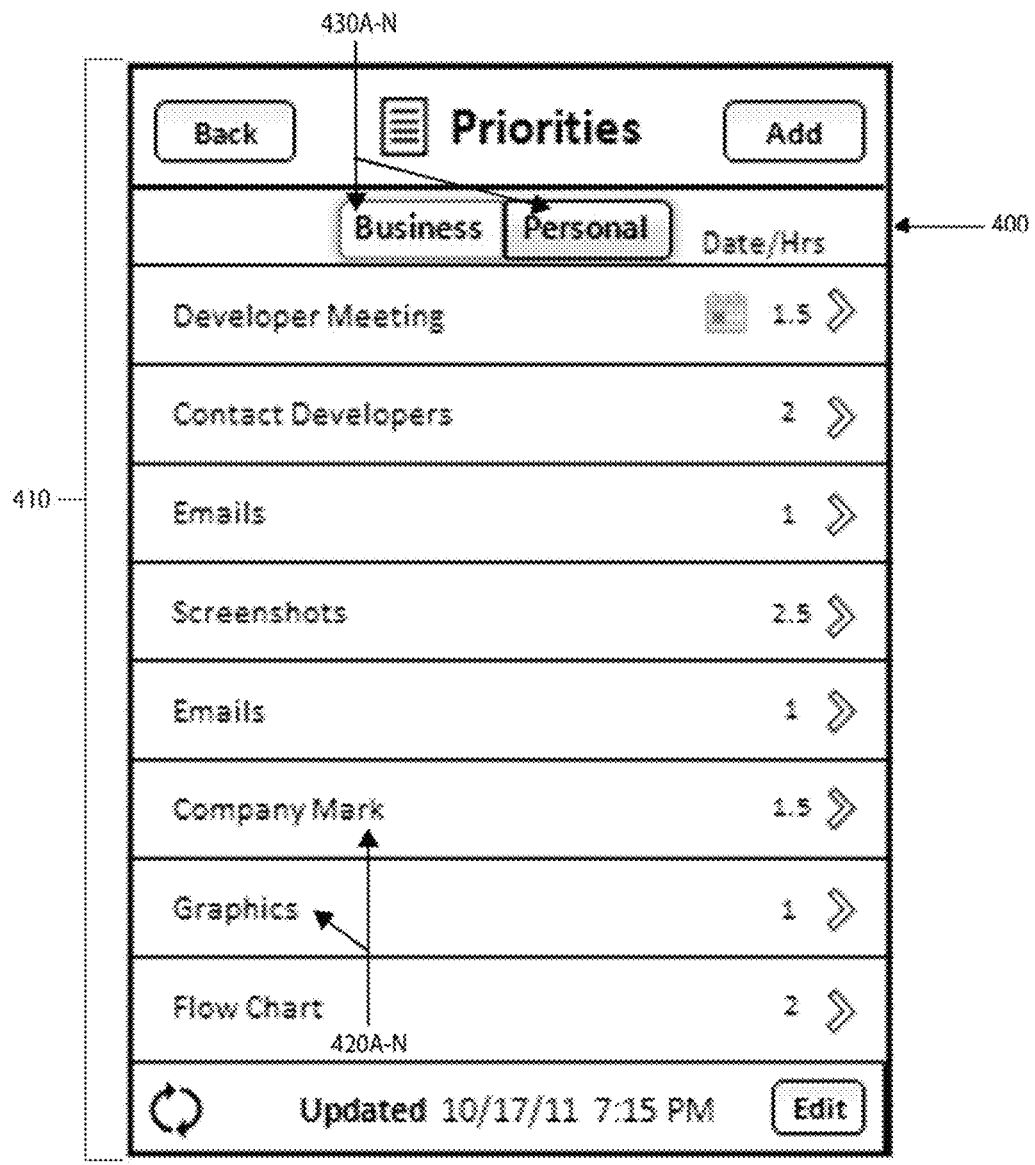
FIG. 4 depicts an exemplary screenshot showing an interface that enables the presentation of tasks in a list view in accordance with at least one embodiment disclosed herein.

At this juncture, it should be understood that the various scheduling schemes referenced herein can be arranged in a number of different forms and formats. In one arrangement, a scheduling scheme can comprise an ordered task listing, such as the one depicted in FIG. 4. FIG. 4 depicts an exemplary screenshot generated by coordination application 170, showing an interface 410 that enables the presentation of various tasks 420A-N (collectively referred to as tasks 420) in a list view. Such a view preferably depicts a set of tasks 420, such as those tasks that are of the highest priority and thus should be performed more immediately. Various filters 430A-N (collectively referred to as filters 430) can also be applied to the list in order to show only those tasks 420 that meet the selected requirements. For example, a business and/or personal filter 430A-N can be applied which enables the filtering of various tasks 420 according to business/personal classifications, as will be described in greater detail below. In doing so, the user can view only those tasks 420 that are associated with the selected classification. It can be appreciated that by presenting a user with a list view of certain of and/or all of the tasks that are to be completed, such as that depicted in FIG. 4, the user can more effectively plan his/her schedule.

It should also be noted that, as described in greater detail below, certain tasks 420 are designated as 'fixed,' in that they must be performed at a specified time/date (e.g., lunch), and cannot be rescheduled. Accordingly, it can be appreciated that such fixed tasks do not necessarily have an accompanying priority rank, because these tasks must be performed at specified times, irrespective of how such tasks compare with the priority rank of other tasks. Thus, while the list view of various tasks 420, such as that depicted in FIG. 4 can depict various tasks as prioritized by their priority rank, such fixed tasks (which do not have a priority rank) do not necessarily fit into this presentation paradigm. At the same time, it is advantageous for a user have the ability to view a list of the next number of tasks that he/she must perform, which can include one or more fixed tasks which, as noted above, do not have a priority rank.

Accordingly, the present systems and methods described herein account for this discrepancy by presenting fixed tasks in a list view (such as that depicted in FIG. 4) as a function of the time until the task is to be performed. That is, a framework is established (by default and/or defined/modified by the user) that establishes a correlation between the time until a particular fixed task is to be performed and a priority rank. Thus, for example, in one framework less than two days before a fixed task must be performed can be correlated with a "high" priority rank, between four and two days before a fixed task must be performed can be correlated with a "medium" priority rank, and more than four days before a fixed task must be performed can be correlated with a "low" priority rank. Based on such a framework, various fixed tasks can be shown in a list view (such as that depicted in FIG. 4) among other tasks that have priority ranks, and such fixed tasks can be depicted within the priority rank framework, despite not actually having a priority rank themselves. As illustrated the time until the fixed task must be performed can be correlated with the various priority rank levels.

Figure 5A:
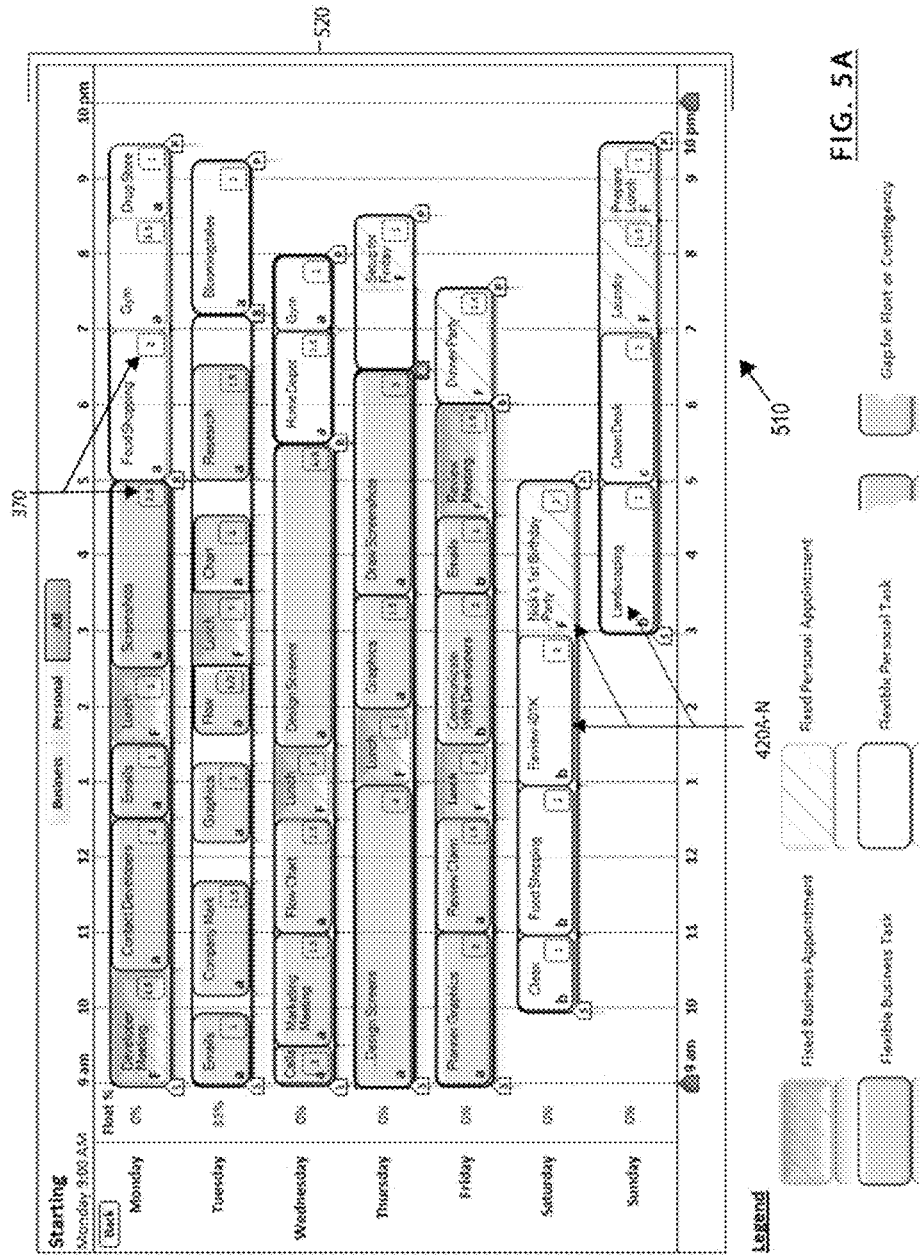
FIG. 5A depicts an exemplary screenshot showing an interface that enables the presentation of tasks as a task-populated calendar in accordance with at least one embodiment disclosed herein.
Figure 5B:
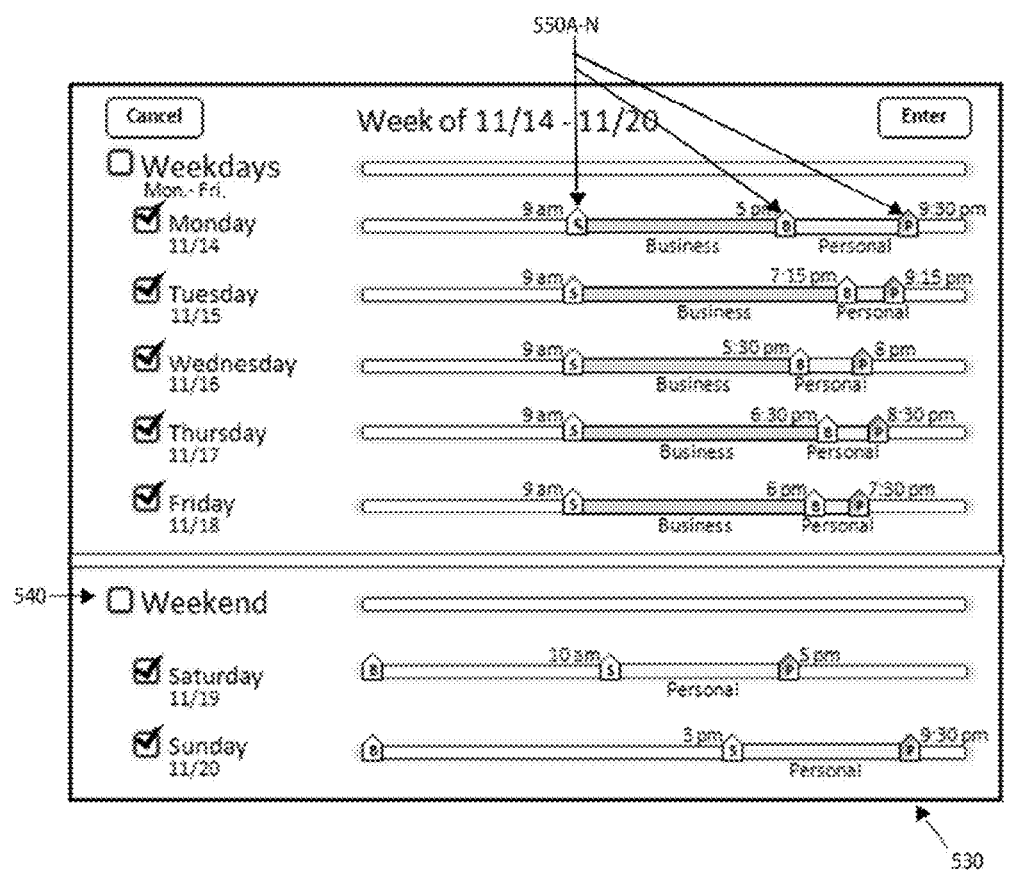
FIG. 5B depicts an exemplary screenshot showing an interface that enables a user to define scheduling parameters in accordance with at least one embodiment disclosed herein.

It should also be understood that in another arrangement, the referenced scheduling scheme can comprise a task-populated calendar, such as the one depicted in FIG. 5A. FIG. 5A depicts an exemplary screenshot generated by coordination application 170, showing an interface 510 that enables the presentation of various tasks 420A-N (collectively referred to as tasks 420) as a task-populated calendar. Such a view preferably depicts the various tasks 420 in a chronological sequence in relation to one or more particular dates and/or times on a calendar. It should be understood that while the calendar in FIG. 5A reflects a weekly calendar view (wherein the Y-axis corresponds to individual days of the week and the X-axis corresponds to particular times during each day), this view is exemplary, and the systems and methods disclosed herein can be similarly applied in practically any calendar format or view, such as daily, monthly, yearly, etc. For example, FIGS. 5C and 5E depict presentations of various tasks 420A-N in a list view, while FIG. 5D depicts a presentation of various tasks 420A-N as making up various phases or stages 560A-N (collectively 560) of a project.

Figure 5D:
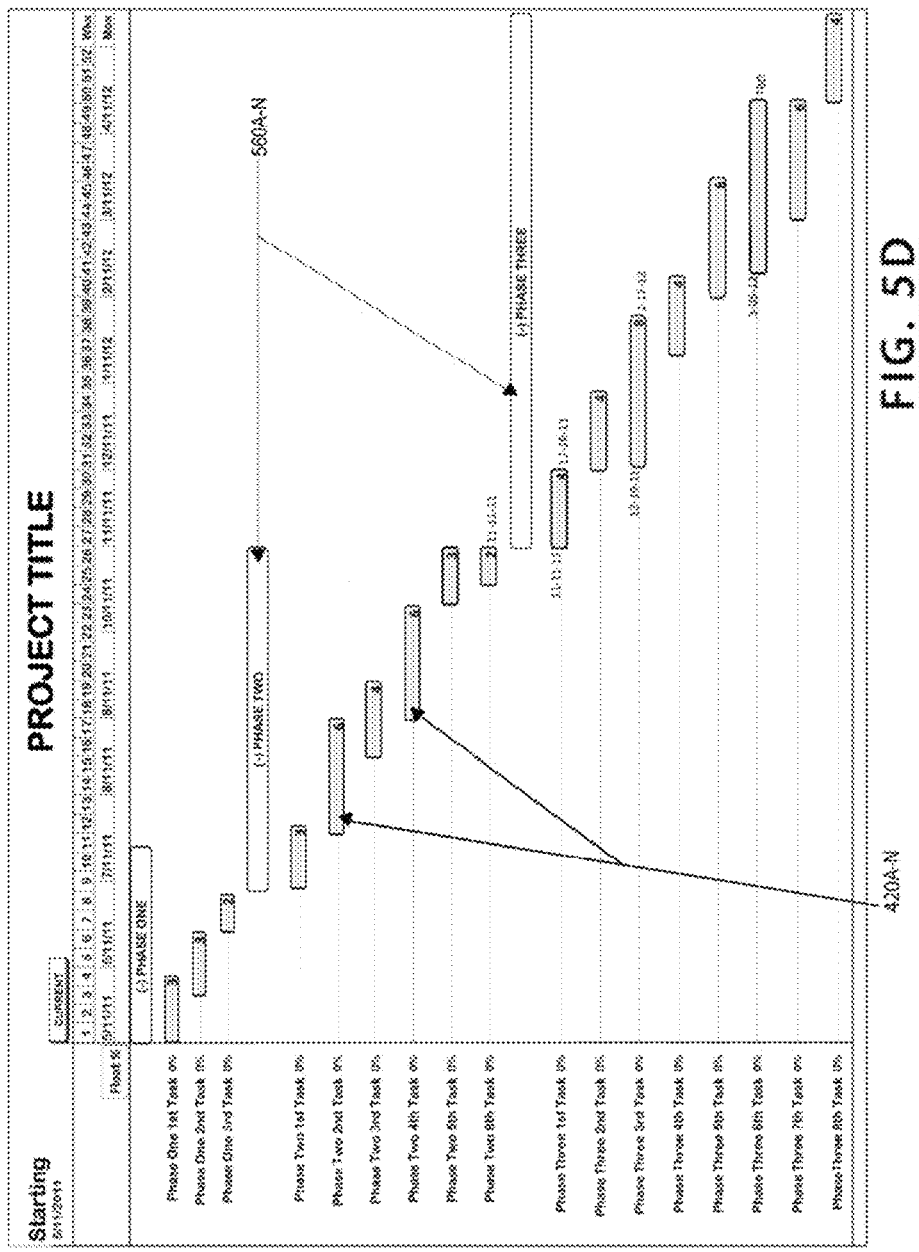
FIG. 5D depicts an exemplary screenshot showing a presentation of tasks as making up phases or stages of a project in accordance with at least one embodiment disclosed herein.
Figure 5E:
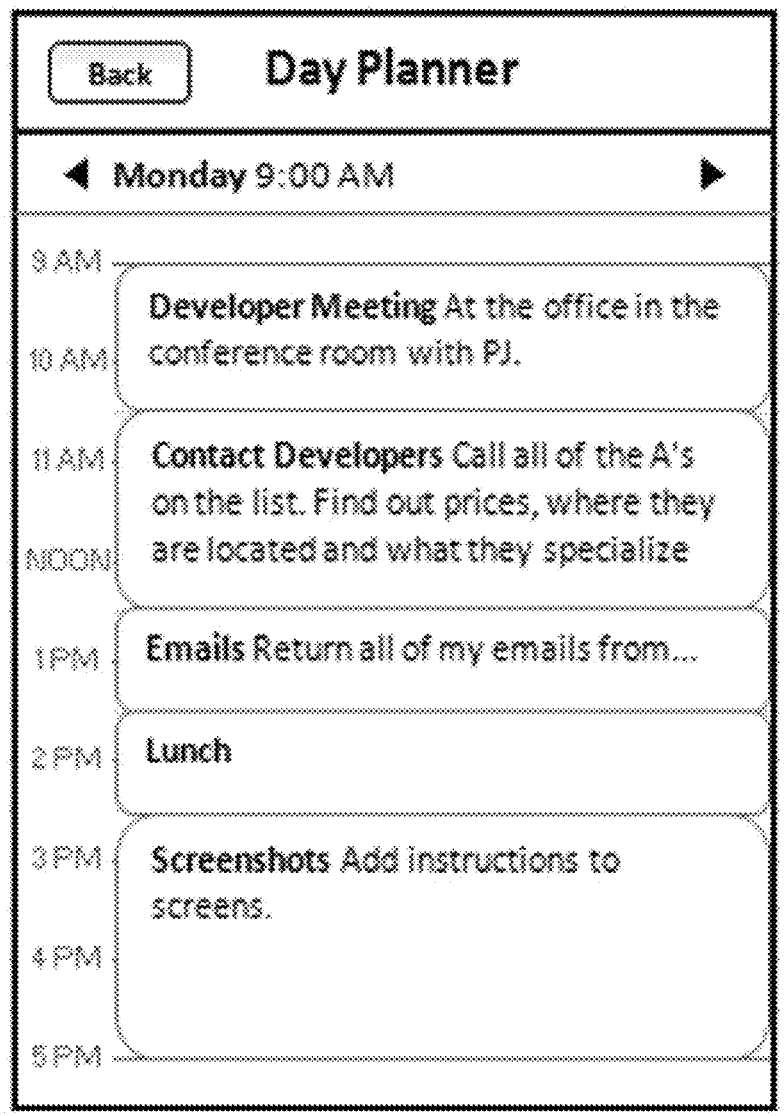
FIG. 5E depicts an exemplary screenshot showing a presentation of tasks in a list view in accordance with at least one embodiment disclosed herein.

At this juncture it can also be appreciated, with reference to FIG. 5D, that in certain arrangements, one or more tasks 420 and/or task groupings 560 (such as phases or stages of a project) can be stored and/or otherwise maintained, such as at database(s) 180 and/or 182 of dynamic coordination system 100, though some or all of such tasks 420 and/or task groupings 560 can be withheld and/or otherwise excluded when various scheduling schemes are generated. That is, it can be appreciated that certain projects, particularly multi-stage or multi-phase projects, can frequently include a large number of individual tasks, however only certain of those tasks (for example, those comprising the first phase) can actually be scheduled with any degree of accuracy at the early stages of the project. Nevertheless, it can be advantageous for a user to be able to view and appreciate the scope of the entire project, despite the fact that certain tasks (such as those that comprise later phases of the project) have not yet been formally scheduled (that is, are not included within the currently generated scheduling scheme). Accordingly, such tasks 420 and/or phases 560 can be established and stored, thus allowing the user to view the entirety of a project, though such tasks/phases are withheld from inclusion in the current scheduling scheme. As the project progresses, the user can periodically indicate or select certain tasks for inclusion into the current scheduling scheme, thus "releasing" such tasks into the current schedule. In doing so, the user can both conceive of the entire scope of a given project or set of tasks, while at the same time selecting only certain tasks for inclusion into the current scheduling scheme. It should be noted that in certain arrangements, the release/selection of which tasks to include in the scheduling scheme can be automated, such as though established rules (e.g., release the next five tasks when the previous five are complete), as described in detail herein.

Figure 11:
FIG. 11 depicts an exemplary screenshot of an interface that shows an exemplary time inventory.

Turning now to FIG. 5B, a further exemplary screenshot 530 is depicted, showing an interface 540 generated by coordination application 170 that enables a user to define various scheduling parameters 550A-N (collectively, scheduling parameters 550). By defining scheduling parameters 550, a user can define various timeframes throughout a given day (or week, month, etc.) that are to be dedicated to tasks 420 having certain classifications 350. For instance, as shown in FIG. 5B, the user has defined that the timeframe of 9 am-5 pm is designated for tasks 420 having a 'Business' classification, and the time from 5 pm-9:30 pm as designated for tasks 420 having a 'Personal' classification. Conversely, on Tuesday, the user has defined the 'Business' timeframe as extending until 7:15 pm, and the 'Personal' timeframe as extending only until 9:15 pm. In defining such scheduling parameters 550, the user defines one or more time inventories that can be maintained by dynamic coordination system 100. A time inventory represents a collection of one or more scheduling parameters, and, preferably, a classification (e.g., business or personal) associated with the collected scheduling parameters. For example, with further reference to FIG. 5B, a time inventory can be defined that reflects a collection of all of the time (as defined by scheduling parameters 550) that is classified as business time during the week of November 14-November 20, thereby configuring and customizing the operation of the systems and methods disclosed herein to define a prioritized arrangement of tasks 420 that optimizes the utilization of the time inventory through compliance with the scheduling parameters defined by the user for a given day, week, month, etc. FIG. 11 further illustrates an exemplary time inventory. It can be appreciated, with referenced to FIG. 11, that a time inventory can reflect the total number of hours available over a given period of time (e.g., the next 7 days, the next 30 days, etc.), as well as the number of hours that have already been allotted to various types of tasks (e.g., tasks having various priority levels, fixed tasks, etc.).

It can thus be further appreciated that in generating a scheduling scheme, coordination application 170 accounts not only for the priority ranks of the various tasks that are to be scheduled, but also for the various related and associated parameters that pertain to the given task. For example, as noted above, certain tasks (such as meetings) can have fixed or set times during which they must be performed. Accordingly, in certain scenarios a fixed task having a lower priority rank is scheduled prior to a non-fixed task having a higher priority rank, thus accounting for the inflexible nature of the fixed task. Additionally, coordination application 170 further accounts for the various scheduling parameters 550 (as depicted in FIG. 5B and referenced above) by generating a scheduling scheme that reflects the defined scheduling parameters (e.g., 'Business' and 'Personal' timeframes). Put differently, coordination application 170 can generate a scheduling scheme by arranging the various scheduled tasks within an available time inventory that corresponds to an optimized arrangement of tasks within the allotted time inventory. Accordingly, it can be appreciated with collective reference to FIGS. 5A and 5B that tasks that are classified as 'Business' are only scheduled until 5 pm on Monday. While other 'Business' classified tasks having higher priority rankings may remain, coordination application 170 only schedules tasks classified as 'Personal' from 5 pm-9:30 pm on Monday. The remaining 'Business' classified tasks can be scheduled in the manner described herein beginning on Tuesday at 9 am and continuing until all tasks are scheduled, as shown.

It should also be noted that the estimated number of hours 370 that are ascribed to a given task 420 are also accounted for by coordination application 170 in generating a prioritized arrangement of the tasks. For example, as shown in FIG. 5A, the estimated hours 370 ascribed to a task 420 are depicted together with the task itself in interface 520. In considering the estimated number of hours, coordination application 170 can organize and arrange the various tasks 420 such that the available time on a given day, week, month, etc., can be utilized in an optimized fashion. For example, the 'Emails' task shown in FIG. 5A as being scheduled on Monday from 12:30-1:30 pm can be of a lower priority than the 'Screenshots' task scheduled for later in the day. However, given the limited time available for scheduling, as well as certain fixed tasks (e.g., 'Lunch'), coordination application 170 can schedule the 'Emails' task prior to the 'Screenshots' task, despite the fact that 'Screenshots' may actually have a higher priority rank. It can be appreciated that in doing so the coordination application 170 maximizes the available time and optimizes the scheduling scheme by arranging the various tasks to utilize the available time in the most efficient way (though it should be understood that in certain arrangements any number of tasks can be arranged in a manual fashion as well). By way of further illustration, the 'Calls' task shown in FIG. 5A as being scheduled on Wednesday from 9:00-9:30 am can be of a lower priority than the 'Design Screens' task scheduled for later that day. But again, given the available scheduling time and fixed tasks (e.g., 'Lunch'), coordination application schedules the 'Calls' task prior to the 'Design Screens' task in order to optimize the scheduling scheme by utilizing as much as possible of the available (that is, currently unscheduled) time. Thus, coordination application 170 ensures that that the various tasks are arranged in an optimized manner, thereby presenting a user with a dynamic schedule which identifies which particular task should be performed at a particular time, accounting for the various priority ranks and scheduling constraints of each respective task.

Returning to FIG. 2, At step 230, processor 110 executing one or more of software modules 130, including, preferably, coordination application 170, further processes one or more of the tasks (such as a new or recently received task together with previously received tasks) based on the priority rank adjustment parameter. That is, given that the priority rank adjustment parameter defines how the priority rank of a particular task can change over time, it can be appreciated that such changes can affect how various tasks should be prioritized vis a vis one another. Thus, upon the triggering of a priority rank adjustment parameter (e.g., one week before a target completion date) the priority rank of the associated task is to change (whether being increased or decreased, as described above). As such, the various tasks can be re-processed in substantially the same manner as described above, in order to account for the change in priority rank. In doing so, a new scheduling scheme is generated. The new scheduling scheme preferably accounts for the priority rank adjustment parameters of the various tasks, as described above, thereby arranging the various tasks in a way that accounts for the priority rank adjustment parameters of each of the tasks, and which influences the arrangement and/or ordering of such tasks relative to one another.

Then, at step 240, processor 110 executing one or more of software modules 130, including, preferably, coordination application 170, receives a status notification from a user concerning one or more of the tasks. Examples of such a status notification include, but are not limited to: an indication of completion of a particular task, an instance of execution of the coordination application, an addition of a task, a deletion of a task, and a modification to at least one of the priority rank, the priority rank adjustment parameter, the target date, the classification, the associated application and the associated action of a particular task, though it should be noted that the status notification can be practically any notification that pertains, whether directly or indirectly, to the status of a particular task or tasks, or to the system 100 as a whole. It should also be noted that the expiration or passing of a duration of time, and/or the passing of a particular date and/or time are further examples of status notifications. It can be appreciated that such a status notification, such as an indication of a completion of a particular task, can affect the arrangement and prioritization of any number of tasks.

At step 250, processor 110 executing one or more of software modules 130, including, preferably, coordination application 170, further processes one or more of the tasks (such as those tasks that remain after a particular task has been completed) based on the status notification. In doing so, a further scheduling scheme can be generated which accounts for the status notification, substantially in the same manner described above at step 230.

It should be noted that at practically any juncture, a user can manually adjust and/or edit a generated scheduling scheme, such as by adjusting the arrangement of one or more tasks 420, such as with a "drag and drop" functionality or operation, as is known to those of ordinary skill in the art. Such an adjustment can also constitute a status notification as described herein, and thus the remaining tasks can be further processed in order to generate a further scheduling scheme in light of the user adjustment.

Figure 6A:
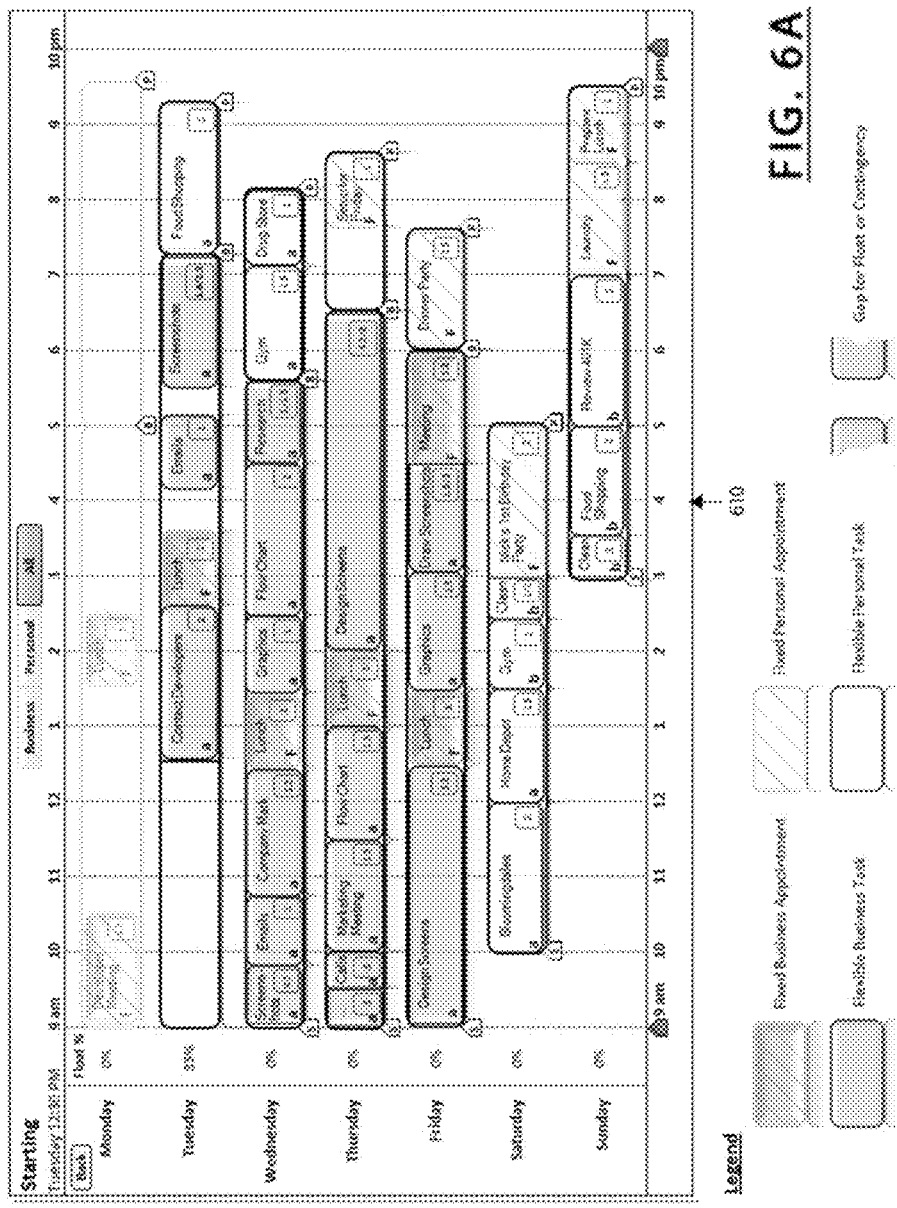
FIG. 6A depicts an exemplary screenshot showing a further scheduling scheme in accordance with at least one embodiment disclosed herein.

FIG. 6A depicts an exemplary screenshot 610 generated by coordination application 170, showing a further scheduling scheme generated based on the scheduling scheme shown in FIG. 5A. As noted, the further scheduling scheme can be generated based on a status notification, such as the activation or initiation of coordination application 170. Thus, while FIG. 5A corresponds to a scheduling scheme generated at and/or corresponding to Monday at 9:00 am (as shown in the upper left-hand corner of the scheduling scheme depicted in FIG. 5A, the scheduling scheme of FIG. 6A corresponds to a scheduling scheme generated at and/or corresponding to Tuesday at 12:30 pm. It should be understood that the scheduling scheme of FIG. 6A is preferably generated upon activation and/or initiation of coordination application at the designated time (Tuesday at 12:30 pm). Accordingly, in the scenario illustrated by FIG. 6A, the various tasks (or, at minimum, those tasks which are flexible and not fixed) corresponding to times/dates prior to Tuesday at 12:30 pm (such as those previously scheduled on Monday, as well as Tuesday morning, as seen in FIG. 5A) can be re-populated into the scheduling scheme seen in FIG. 6A, beginning Tuesday at 12:30 pm. Thus, it can be appreciated with collective reference to FIGS. 5A and 6A that the task 'Contact Developers,' scheduled in FIG. 5A on Monday from 10:30 am-12:30 pm is repopulated in FIG. 6A to be scheduled on Tuesday from 12:30 pm-2:30 pm. In doing so, the coordination application can dynamically re-populate previously scheduled tasks that have not been completed, further accounting for the various priority ranks and scheduling constraints (e.g., estimated hours) referenced above.

It should be noted that at practically any point in time, one or more indications can be provided and/or received (including, but not limited to the status notifications referenced herein) indicating the completion of a task or tasks. In receiving such an indication, coordination application 170 can account for the fact that the indicated task or tasks are complete and thus are not to be re-populated in the manner described above. It should be understood, however, that records of such completed tasks are maintained, thus enabling a user to subsequently reverse the previous indication that the task is complete. In doing so, coordination application can account for this change as it does any other such status notification, in the manner described herein. In any event, a given scheduling scheme can account for any and all such completed tasks, such as the one depicted in FIG. 6B.

Figure 6B:
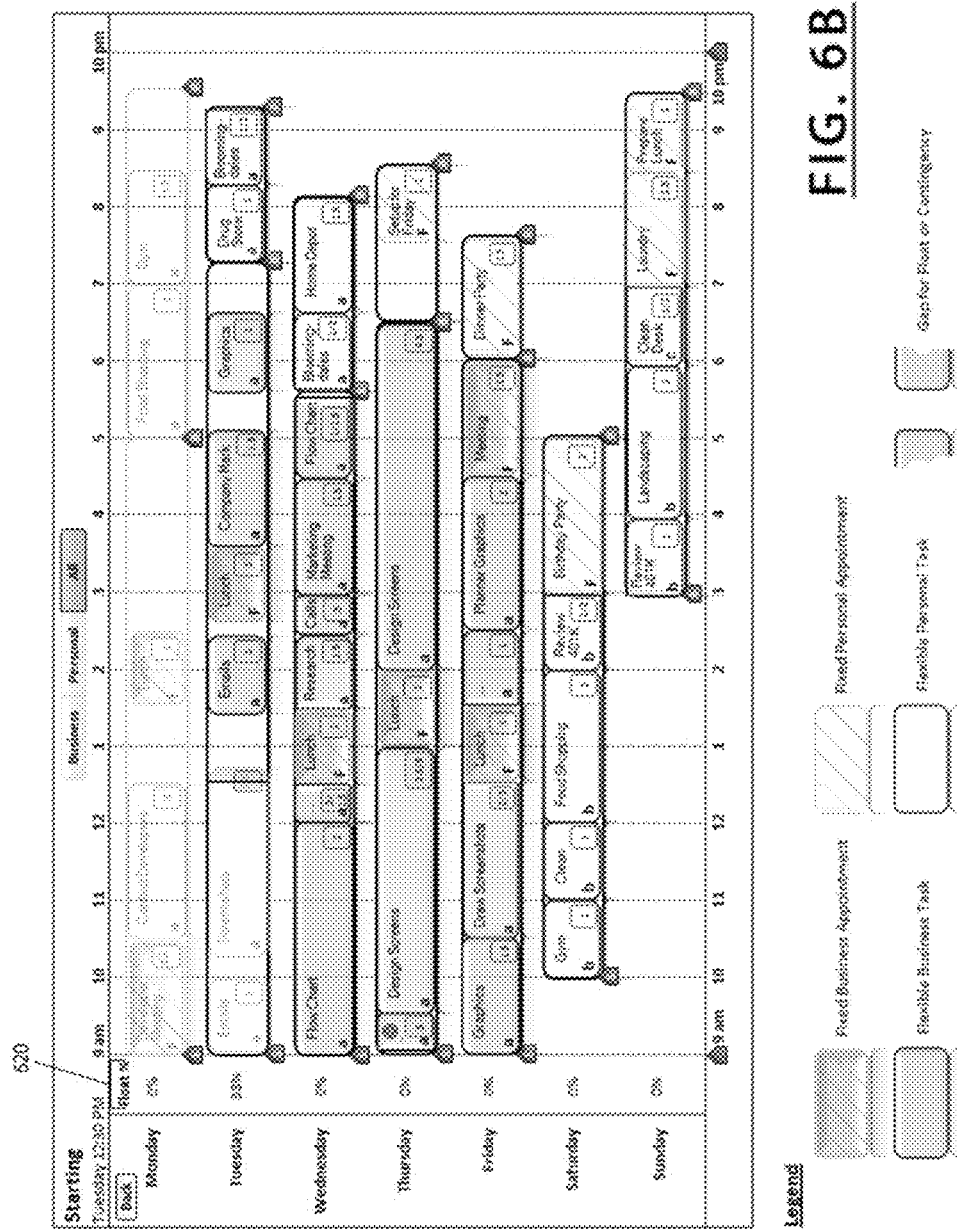
FIG. 6B depicts an exemplary screenshot showing yet a further scheduling scheme in accordance with at least one embodiment disclosed herein.

It can be further appreciated with reference to FIG. 6B that a float percentage 620 can be ascribed to one or more tasks 420 and/or groups of tasks (e.g., days of the week and/or project phases such as those depicted in FIG. 5D). Float percentage 620 preferable reflects the degree of flexibility and/or leeway that one or more tasks 420 should be given when they are scheduled. For example, it can be appreciated that at the early stages of a project it can be difficult to accurately estimate the amount of time that various tasks will take, due to unexpected circumstances and/or changes in plan that often arise. Accordingly, assigning a float percentage 620 to such tasks serves to add an additional time "buffer" around certain (or all) scheduled tasks, thus allowing extra scheduling time for unexpected items or events.

By way of illustration, FIG. 6B depicts a scheduling scheme for various days of the week, together with float percentages 620 that correspond to each day. Thus, it can be appreciated that the scheduled tasks on 'Tuesday' are ascribed a 33% float percentage. That is, the scheduling scheme processes the float percentage 620 with the various tasks scheduled for Tuesday, and allots 33% more time for those tasks than was originally indicated. For example, the 'Emails' task, scheduled for Tuesday from 5:30-6:30 pm (that is, one hour) is additionally provided with additional "buffer" time before and after the task, resulting in a total of 1.3 hours on the calendar and thus allowing greater flexibility to address unexpected circumstances or changes that can arise. Put differently, the float percentage 620 can function as a multiplier, such that the number of hours (as depicted at 370 in FIG. 5A) that a particular task 420 is scheduled for can be increased in proportion to the float percentage 620, thus enabling the generation of a dynamic and scheduling scheme that better accounts for changing circumstances and events. It should also be understood that in certain arrangements a float percentage 620 can be ascribed to an individual task 420.

Returning to FIG. 2, at step 255, processor 110 executing one or more of software modules 130, including, preferably, coordination application 170, identifies an insufficiency in the time inventory for allocation of one or more tasks. That is, it can be appreciated that in certain scenarios, it may be impossible to schedule all tasks in accordance with their existing parameters (e.g., target dates, priority ranks, etc.). Given that coordination application 170 arranges tasks within a defined time inventory, situations can arise where the number of tasks (and, particularly, the amount of time that each task is expected to take) exceeds the time inventory available for scheduling. For example, a given week can have a 40 hour time inventory, while having 50 hours of tasks that must be completed by the end of the week. Accordingly, in such situations, coordination application 170 can identify such an insufficiency in the time inventory that has been allotted to one or more tasks.

In other arrangements, the insufficiency can be identified based on one or more target dates. That is, it can be appreciated that a project (or a phase or stage of a project) can comprise multiple tasks, each of which must be completed in order for the project to be completed. Consider, for example, the various phases 560 shown in FIG. 5D, each of which include multiple tasks 420. It can thus be further appreciated that despite initial plans or schedules, at various points during a phase or project, scenarios can arise wherein it can be projected that a target date or deadline will not (or will likely not) be met.

Then, at step 260, processor 110 executing one or more of software modules 130, including, preferably, coordination application 170, prompts a user to input one or more adjustments to address the insufficiency. That is, based on the insufficiency identified at step 255, a prompt (such as a message and/or notification) can be presented or displayed to the user, notifying him/her of the insufficiency. By way of example, such a notification can convey to the user that the user only has a time inventory of 40 hours for a given week, while having 50 hours of tasks that are to be completed during the same week. Moreover, the user can be prompted to provide various modifications in order to address the insufficiency. Continuing with the example referenced above, it can be appreciated that the insufficiency can be remedied by increasing the time inventory (that is, adjusting the scheduling parameters) of the particular week from 40 hours to 50 hours, thereby providing sufficient time for all tasks to be scheduled. It should be understood that various other parameters can also be adjusted, including but not limited to a priority rank, a target date, a classification, and a priority rank adjustment parameter. Thus, by way of further example, the target date of a particular task or tasks can be adjusted, thereby alleviating the insufficiency. In an arrangement where the root of the insufficiency is an approaching target date which is unlikely to be met, as referenced above, the identification of the insufficiency is preferably performed with as much time as possible remaining prior to the target date itself. Accordingly, coordination application 170 can be configured to periodically monitor an existing scheduling scheme for such an insufficiency constantly and/or at regular intervals, and such monitoring can increase as a target date approaches (owing to the increasing likelihood of such an insufficiency as the target date becomes closer).

At this juncture, it should be noted that in certain arrangements the referenced prompt/notification (alerting the user of the insufficiency) can include automated selections or suggestions for adjustment that are provided to the user based on one or more additional parameters or factors. For example, with reference to FIGS. 5A and 5B, it can be appreciated that the scheduling parameters 550 for Thursday (November 17) define a time inventory of 9 am-6:30 pm for business tasks and 6:30 pm-8:30 pm for personal tasks, as shown in FIG. 5B. However, it can be further appreciated, with reference to FIG. 5A, that the user only has a single task ('Setup for Friday') scheduled from 7:30 pm-8:30 pm on Thursday—thus leaving the time from 6:30 pm-7:30 pm unallocated. Accordingly, coordination application 170 can identify this unallocated time by way of the referenced prompt/notification, and can further suggest one or more adjustments (e.g., adjusting the scheduling parameters to allow for the the scheduling of an additional task during this unallocated time) in order to exploit this unallocated time and thus enable the scheduling of additional tasks, thereby optimizing the scheduling scheme and enabling the scheduling of additional tasks. By way of further example, in another scenario the prompt/notification can include automated selections or suggestions for adjustments to one or more priority ranks of one or more tasks. It can be appreciated that by adjusting the priority rank of one or more tasks (specifically, by lowering or downgrading a priority rank), additional, higher priority tasks can be scheduled in their place. Accordingly, in such arrangements the user can be prompted with one or more tasks whose priority rank can be adjusted, and by way of such adjustment will enable the further scheduling of the additional tasks that need to be scheduled, but which cannot be completed due to the above referenced insufficiency.

At step 265, processor 110 executing one or more of software modules 130, including, preferably, coordination application 170, receives the one or more adjustments from the user. It should be understood that in some arrangements such adjustments can be suggested to the user for selection (such as at step 260), while in other arrangements the user can manually adjust one or more parameters, settings, etc., as described above.

At step 270, processor 110 executing one or more of software modules 130, including, preferably, coordination application 170, generates a further scheduling scheme to replace any prior scheduling scheme. That is, coordination application 170 processes one or more tasks while accounting for the received one or more adjustments, thereby generating a further scheduling scheme, substantially in the manner described in detail above.

At step 275, processor 110 executing one or more of software modules 130, including, preferably, coordination application 170, renders a visual depiction of the most recently defined scheduling scheme. Such a visual depiction can, in turn, be visually displayed to a user, enabling the user to view an up-to-date scheduling scheme that properly accounts for the priority rank of the various tasks.

Figure 7:
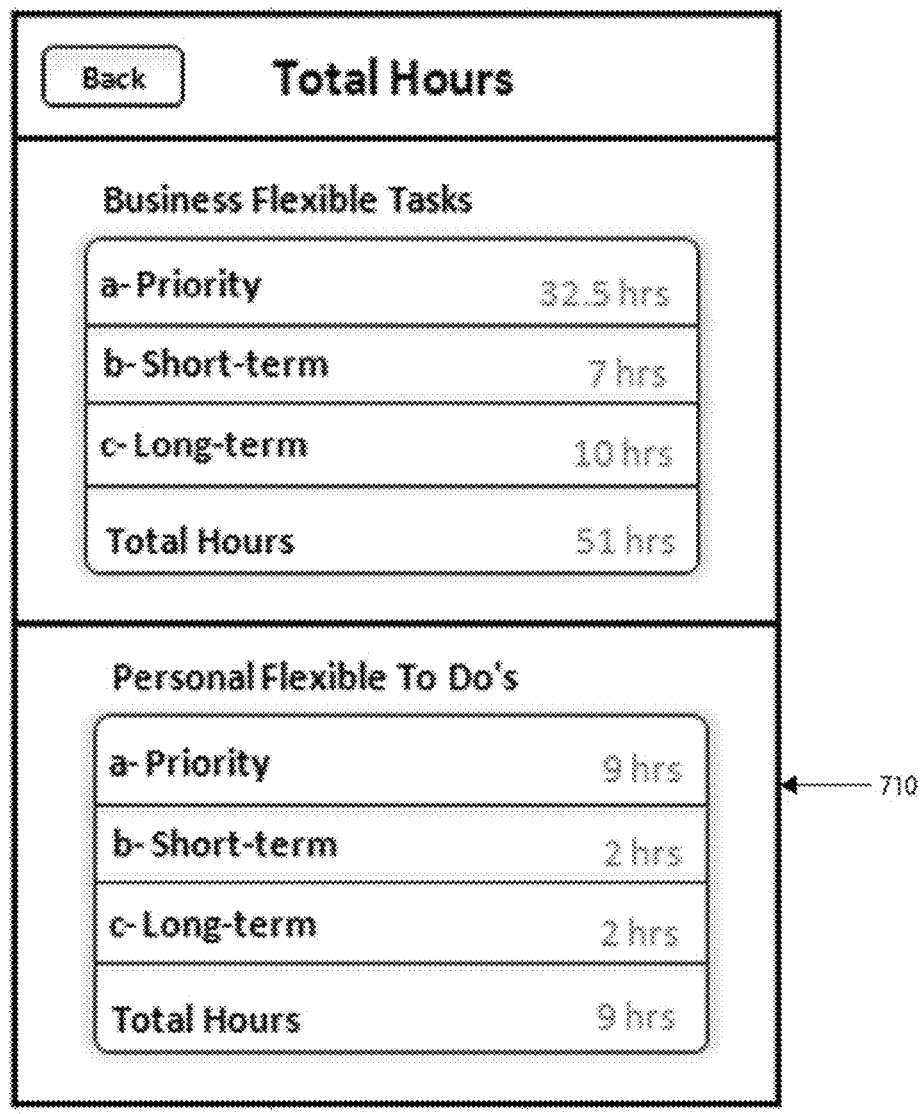
FIG. 7 depicts an exemplary screenshot of an interface that shows the number of hours associated with each individual priority rank, broken down by classification in accordance with at least one embodiment disclosed herein.
Figure 8:
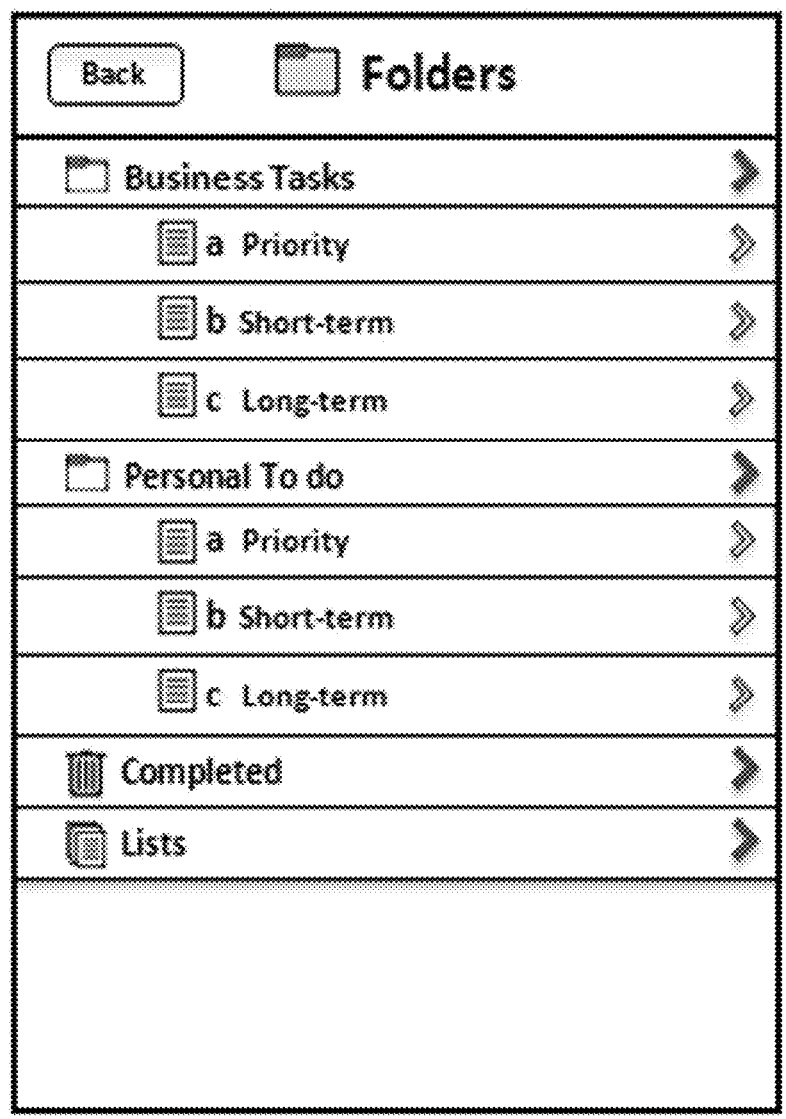
FIG. 8 depicts a folder view, whereby various tasks can be depicted to the user in accordance with various groupings and/or filters in accordance with at least one embodiment disclosed herein.

It should be noted that various additional interfaces can be generated by coordination application 170 and presented to a user, thus enabling the user to view information pertaining to the user's various tasks. For example, FIG. 7 depicts an exemplary screenshot 710 of an interface that shows the number of hours associated with each individual priority rank, broken down by classification ('Business' and 'Personal'). FIG. 8 depicts a folder view, whereby various tasks can be depicted to the user in accordance with various groupings and/or filters based on various related parameters such as classification, priority rank, etc.

It should also be understood that while much of the foregoing description has been directed to the scheduling of tasks that are associated with a single user, the systems and methods disclosed herein can be similarly deployed and/or implemented in scenarios, situations, and settings that encompass multiple users. For example, the present systems and methods can be employed to create one or more dynamic scheduling schemes which account for the various tasks that are associated with each individual user. Such features are particularly advantageous with regard to tasks that require multiple users to attend/participate (e.g., meetings). In such situations, the present systems and methods can account for the respective schedules, parameters, etc., of each user in order to generate one or more scheduling schemes that optimize such scheduling across the respective calendar of each user.

Figure 9:
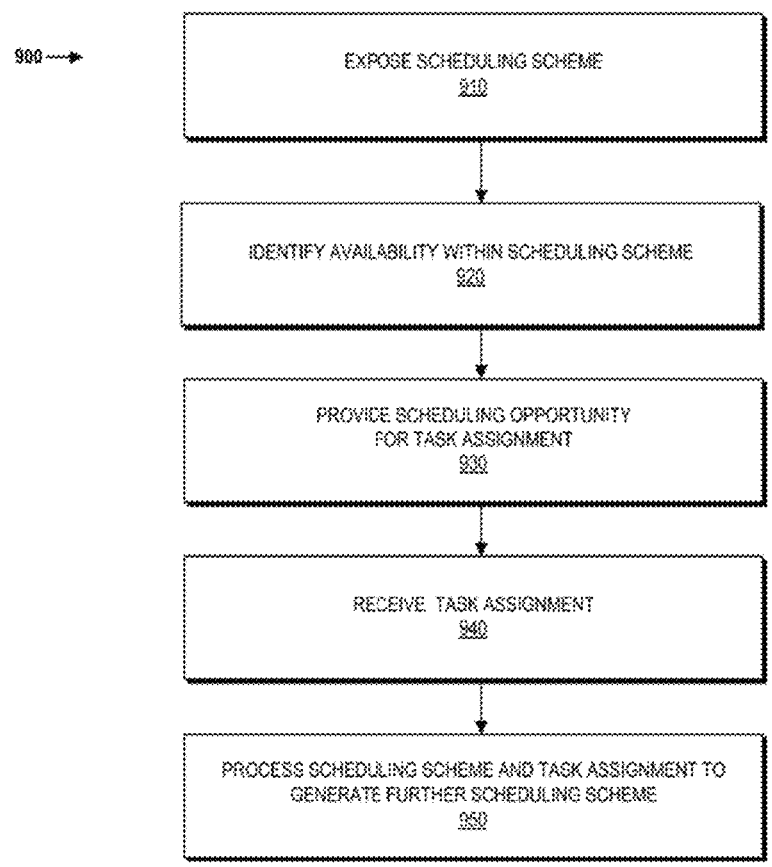
FIG. 9 is a flow diagram showing a routine that illustrates a broad aspect of a method for dynamically coordinating one or more scheduling schemes in accordance with at least one embodiment disclosed herein.

Turning now to FIG. 9, a flow diagram is described showing a routine 900 that illustrates a broad aspect of a method for dynamically coordinating one or more scheduling schemes at a computing device 105 in accordance with at least one embodiment disclosed herein.

The process 900 begins at step 910 where processor 110 executing one or more of software modules 130, including, preferably, coordination application 170, exposes a scheduling scheme of a first user to a second user. That is, it can be appreciated that in multi-user settings, certain users (e.g., managers) have the authority and/or responsibility to manage and/or otherwise control the tasks and/or schedules of other users (e.g., employees). Accordingly, the scheduling scheme associated with a particular user (e.g., an employee) can be exposed to another user (e.g., a manager), thereby enabling such user to view the exposed scheduling scheme.

Then, at step 920, processor 110 executing one or more of software modules 130, including, preferably, coordination application 170, identifies an availability within the scheduling scheme of the first user. In doing so, coordination application 170 analyzes the scheduling scheme to identify times and/or dates where the user does not currently have tasks allocated. In doing so, one or more availabilities in the scheduling scheme can be identified. It can be appreciated that such availabilities (where no other task is scheduled) are often preferable for the scheduling of additional tasks.

At step 930, processor 110 executing one or more of software modules 130, including, preferably, coordination application 170 provides the second user (e.g., a manager) with at least one scheduling opportunity for a task assignment based on the identified availability. That is, having identified one or more availabilities in the schedule of the first user (e.g., an employee), coordination application 170 can prompt and/or otherwise notify the second user (e.g., a manger) of such availabilities, and can further provide the second user with the option of scheduling additional tasks for the first user in such available time slots. As noted above, it can be appreciated that it is generally preferable to schedule additional tasks in available time slots, whenever possible.

Then, at step 940, processor 110 executing one or more of software modules 130, including, preferably, coordination application 170, receives a task assignment from the second user (e.g., a manager). Such a task assignment preferably reflects an adjustment to the scheduling scheme of the first user (e.g., an employee). For example, the second user can assign an additional task to the scheduling scheme of the first user. It should be understood that in certain arrangements the second user can further assign the task to a particular date/time (such as in the case of a fixed task), while in other arrangements the second user can simply assign the task to the scheduling scheme of the first user, without specifying a date/time (such as in the case of a flexible task).

At step 950, processor 110 executing one or more of software modules 130, including, preferably, coordination application 170, processes the scheduling scheme of the first user and the task assignment to generate a further scheduling scheme for a first user. For example, in a scenario where the second user (e.g., a manager) assigns a task to the scheduling scheme of the first user (e.g., an employee) without ascribing a particular time/date to the task, coordination application 170 processes the existing scheduling scheme together with the task assignment, substantially in the manner described in detail above (e.g., accounting for the respective priority ranks, target dates, etc., of each of the various tasks in the scheduling scheme), thereby generating a further scheduling scheme for the first user.

At this juncture, it should be noted that in certain arrangements, the process of assigning a task to another user is primarily, if not entirely automated, thus requiring little to no input from the assigning user. By employing the methods described in detail herein, coordination application 170 can assign such tasks in an optimized fashion, without requiring further input or selection by the assigning party.

It should also be noted that the further scheduling scheme that is generated can further account for the scheduling schemes of other users. For example, as noted above, in the event of a meeting which requires the attendance of multiple users, coordination application 170 can account for the respective scheduling schemes of each user in scheduling the task in a manner that is compatible with each of the respective scheduling schemes. In the event that no such scheduling is possible, coordination application can make any necessary adjustments to the respective scheduling schemes in order to achieve the necessary scheduling, substantially in the manner described in detail above (e.g., accounting for the priority rank, target date, etc. of the respective tasks in each scheduling scheme).

Figure 10:
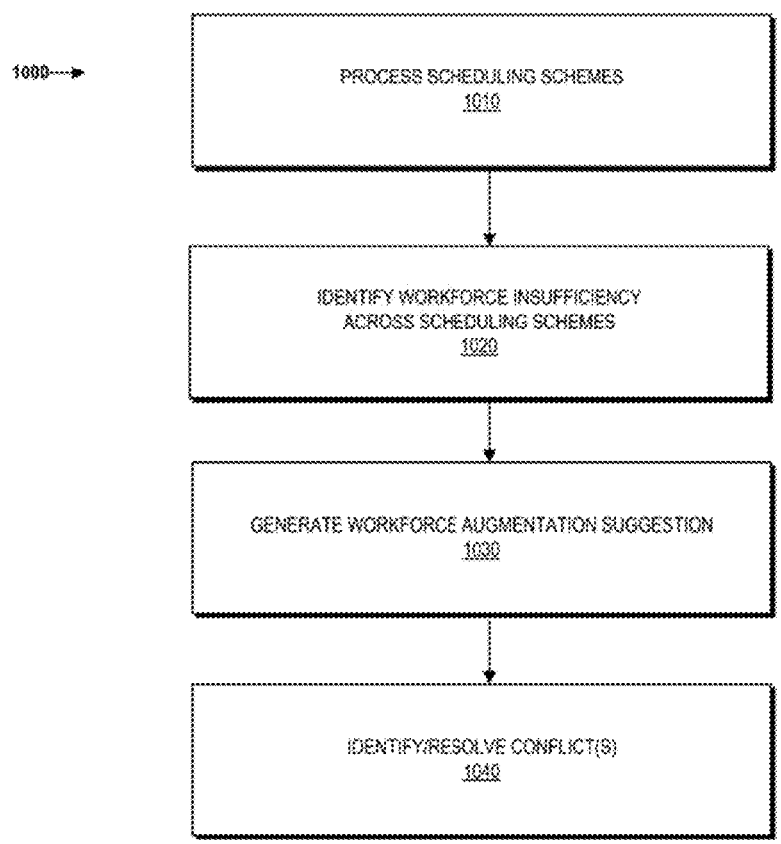
FIG. 10 is a flow diagram showing a routine that illustrates a broad aspect of a method for dynamically managing workload across one or more scheduling schemes in accordance with at least one embodiment disclosed herein.

Turning now to FIG. 10, a flow diagram is described showing a routine 1000 that illustrates a broad aspect of a method for dynamically managing workload across one or more scheduling schemes at a computing device 105 in accordance with at least one embodiment disclosed herein.

The process 1000 begins at step 1010 where processor 110 executing one or more of software modules 130, including, preferably, coordination application 170, processes a first scheduling scheme with a second scheduling scheme. That is, two (or more) scheduling schemes are processed together, with each scheduling scheme corresponding to a respective user. For example, the scheduling schemes of several employees that are assigned to a given project can be processed together.

Then, at step 1020, processor 110 executing one or more of software modules 130, including, preferably, coordination application 170, identifies one or more workforce insufficiencies across the scheduling schemes based on the processing. That is, in processing the various scheduling schemes, coordination application 170 can identify an insufficiency, such as one or more tasks that cannot be scheduled and/or completed given the current workforce that has been assigned to the particular task or tasks.

At step 1030, processor 110 executing one or more of software modules 130, including, preferably, coordination application 170, generates one or more workforce augmentation suggestions to resolve the insufficiency. That is, having identified a workforce insufficiency (e.g., a shortage of manpower that is resulting in one or more tasks being delayed, uncompleted, or impossible to complete), coordination application 170 can generate one or more suggestions that can remedy such insufficiency. For example, having access to the scheduling schemes of various users, coordination application 170 can suggest that another user, such as one whose current scheduling scheme has availability to schedule and perform the various tasks that are necessary (but which otherwise cannot be assigned, given the current workforce). It should be understood that in certain arrangements the suggestion of such additional users can be made with consideration towards the particular skills and experiences of the user, with consideration towards the skills and experiences necessary for the project and/or the outstanding tasks that require performance/completion.

It should also be understood with reference to FIG. 5D that a particular project 560 can have a defined priority level (that is, a priority level that corresponds to the project as a whole), and the various tasks 420 that make up the project can each have their own respective priority levels as well (each priority level corresponding to the priority of that particular task). Accordingly, it should be understood that various notations and/or conventions can be implemented in order to reflect the priority level of both a particular task 420, as well as the priority level of the project 560 to which the task belongs. For example, the priority level of a project can be indicated using upper-case characters (e.g., a level 'A' priority project) while the priority level of a particular task can be indicated using lower-case characters (e.g., a level 'b' priority task). In doing so, both the priority of a particular task as well as the priority of the project that it is a part of can be easily indicated.

At step 1040, processor 110 executing one or more of software modules 130, including, preferably, coordination application 170, identifies one or more conflicts, such as those arising as a result of the workforce augmentation. For example, in a situation where a particular employee is assigned multiple tasks that conflict and/or overlap with one another (or in a situation where a manager is attempting to create such a conflict by assigning a conflicting task to the particular employee), such a conflict can be identified, and processor 110 executing one or more of software modules 130, including, preferably, coordination application 170 can preferably facilitate a resolution of the conflicts, e.g., through coordination with the two managers to determine which task should ultimately take precedence.

At this juncture, it should be noted that although much of the foregoing description has been directed to systems and methods for dynamic coordination, the systems and methods disclosed herein can be similarly deployed and/or implemented in scenarios, situations, and settings far beyond the referenced scenarios. It can be readily appreciated that dynamic coordination system 100 can be effectively employed in practically any scenario where such dynamic coordination is of value. It should be further understood that any such implementation and/or deployment is within the scope of the systems and methods described herein. Additionally, it can be appreciated that implementation of the systems and methods disclosed herein enables a user to project those tasks that can and/or cannot be accomplished in a given timeframe.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer usable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for dynamic depiction and coordination. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for dynamically managing workload across one or more scheduling schemes using a computing device, the computing device having a hardware processor, a memory, and a coordination application stored in the memory and executable by the processor, the method comprising:
   processing a first scheduling scheme with a second scheduling scheme, each of the scheduling schemes corresponding to a respective user;
   based on the processing, identifying a workforce insufficiency across the processed scheduling schemes by,
      comparing the time inventory across the processed first scheduling scheme and the processed second scheduling scheme for allocation of one or more tasks, one or more target dates, one or more priority ranks, one or more classifications, or one or more priority rank adjustment parameters associated with each scheduling scheme; and
   generating one or more workforce augmentation suggestions to resolve the insufficiency by,
      identifying available time inventory sufficient to resolve the insufficiency in the processed first scheduling scheme or processed second scheduling scheme, and
      automatically selecting for suggestion, adjustments to the allocation of the one or more tasks, one or more target dates, one or more priority ranks, one or more classifications, or one or more priority rank adjustment parameters associated with the processed first scheduling scheme or processed second scheduling scheme to fill the identified available time inventory.

2. The method of claim 1, wherein the automatic selecting for suggestion of the one or more generated workforce augmentation suggestions comprises generating a scheduling scheme including the one or more workforce augmentation suggestions that is neither the first scheduling scheme nor the second scheduling scheme.

3. The method of claim 1, wherein the one or more workforce augmentation suggestions are generated based on one or more skills.

4. The method of claim 1, further comprising identifying one or more conflicts arising as a result of the workforce augmentation.

5. The method of claim 4, further comprising facilitating a resolution of the one or more conflicts.

6. The method of claim 1, wherein the first scheduling scheme comprises an arrangement of a plurality of stored tasks, each task having a priority.

7. The method of claim 6, wherein the first scheduling scheme defines a prioritized arrangement of the first task relative to the stored tasks on the basis of the priority rank associated with the first task.

8. The method of claim 7, wherein at least one of the stored tasks has a priority rank adjustment parameter, and wherein, based on the priority rank adjustment parameter, further comprising processing the first task and the stored tasks whereby the first scheduling scheme dynamically defines a prioritized arrangement of the first task and the stored tasks that accounts for the respective priority rank adjustment parameters by influencing the arrangement of the first task and the stored tasks relative to one another.

9. The method of claim 7, wherein the second scheduling scheme comprises a dynamically defined prioritized arrangement of a plurality of stored tasks, each task having a priority, and wherein the one or more workforce augmentation suggestions are provided in view of the priority of the stored tasks of the first and second scheduling schemes.

10. The method of claim 1, wherein at least one of the first scheduling scheme and the second scheduling scheme comprises at least one of an ordered task listing and a task-populated calendar.

11. The method of claim 1, wherein at least one of the first scheduling scheme and the second scheduling scheme is generated based on a float percentage.

12. The method of claim 11, wherein the float percentage comprises a multiplier that is applied against a duration parameter of at least one task.

13. The method of claim 1, wherein the first and second scheduling schemes comprise a plurality of stored tasks, and wherein at least one of the stored tasks is a fixed task.

14. The method of claim 13, further comprising processing a duration of time, the duration of time reflecting the time until the fixed task is scheduled, in order to generate a corresponding priority rank for the fixed task.

15. The method of claim 1, wherein at least one of the first scheduling scheme and the second scheduling scheme are generated based on a time inventory.

16. The method of claim 15, wherein the time inventory corresponds to one or more classifications.

17. The method of claim 1, wherein each scheduling scheme is associated with a classification, and wherein the processor is configured to generate plural first scheduling schemes, each corresponding to a particular classification.

18. The method of claim 1, further comprising identifying an availability within the first scheduling scheme of a first user.

19. The method of claim 18, further comprising providing a second user with at least one scheduling opportunity for the task assignment based on the availability, wherein the scheduling opportunity further accounts for a scheduling scheme of another user that is not the first user.

20. A method for dynamically managing workload across one or more scheduling schemes using a computing device, the computing device having a hardware processor, a memory, and a coordination application stored in the memory and executable by the processor, the method comprising:

processing a first scheduling scheme with a second scheduling scheme, each of the scheduling schemes corresponding to a respective user;

based on the processing, identifying a workforce insufficiency across the processed scheduling schemes by, comparing the time inventory across the processed first scheduling scheme and the processed second scheduling scheme for allocation of one or more tasks, one or more target dates, one or more priority ranks, one or more classifications, or one or more priority rank adjustment parameters associated with each scheduling scheme; and generating one or more workforce augmentation adjustments to resolve the insufficiency by, identifying available time inventory sufficient to resolve the insufficiency in the processed first scheduling scheme or processed second scheduling scheme, and automatically adjusting the allocation of the one or more tasks, one or more target dates, one or more priority ranks, one or more classifications, or one or more priority rank adjustment parameters associated with the processed first scheduling scheme or processed second scheduling scheme to fill the identified available time inventory.

* * * * *